United States Patent
Lin et al.

(10) Patent No.: US 10,873,980 B2
(45) Date of Patent: Dec. 22, 2020

(54) CONNECTION CONTROL APPARATUS AND METHOD

(71) Applicant: HUAWEI TECHNOLOGIES CO., LTD., Shenzhen (CN)

(72) Inventors: Bo Lin, Beijing (CN); Hong Wang, Beijing (CN); Yajuan Li, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 163 days.

(21) Appl. No.: 15/890,453

(22) Filed: Feb. 7, 2018

(65) Prior Publication Data

US 2018/0167986 A1    Jun. 14, 2018

Related U.S. Application Data

(63) Continuation of application No. PCT/CN2015/086407, filed on Aug. 7, 2015.

(51) Int. Cl.
*H04W 76/11* (2018.01)
*H04W 76/22* (2018.01)
(Continued)

(52) U.S. Cl.
CPC .............. *H04W 76/11* (2018.02); *H04W 8/26* (2013.01); *H04W 36/0016* (2013.01);
(Continued)

(58) Field of Classification Search
CPC .......... H04L 61/2007; H04W 36/0016; H04W 36/0033; H04W 64/006
See application file for complete search history.

(56) References Cited

U.S. PATENT DOCUMENTS 9,560,625 B2*   1/2017   Chen ................ H04W 60/00
2009/0264095 A1* 10/2009  Khetawat .......... H04W 92/12
                                                  455/404.2
(Continued)

FOREIGN PATENT DOCUMENTS

CN   103096290 A   5/2013
CN   103731900 A   4/2014
(Continued)

OTHER PUBLICATIONS

ZTE, "Discussion on D2D Direct Communication," 3GPP TSG-RAN WG2, Meeting #83, Agenda Item: 7.5.2, Aug. 2013, R2-132681, 5 pgs.
(Continued)

*Primary Examiner* — Parth Patel
*Assistant Examiner* — Berhanu D Belete
(74) *Attorney, Agent, or Firm* — Womble Bond Dickinson (Us) LLP

(57) ABSTRACT

The present disclosure relates to a connection control apparatus and method. The method includes: receiving a link configuration request message sent by a second terminal; sending a bearer configuration request message to a network-side device according to the link configuration request message; receiving a bearer configuration complete message that is sent by the network-side device according to the bearer configuration request message; establishing a mapping relationship between the service bearer and the second terminal; and sending a link configuration complete message to the second terminal after the mapping relationship is established, so that the second terminal performs data transmission with the network-side device over the service bearer by using the first terminal.

20 Claims, 18 Drawing Sheets

(51) Int. Cl.
*H04W 76/10* (2018.01)
*H04W 8/26* (2009.01)
*H04W 36/00* (2009.01)
*H04W 64/00* (2009.01)
*H04W 72/04* (2009.01)
*H04W 76/14* (2018.01)
*H04L 29/12* (2006.01)
*H04W 88/04* (2009.01)
*H04W 88/06* (2009.01)

(52) U.S. Cl.
CPC ....... *H04W 64/006* (2013.01); *H04W 72/048* (2013.01); *H04W 72/0413* (2013.01); *H04W 76/10* (2018.02); *H04W 76/22* (2018.02); *H04L 61/2007* (2013.01); *H04W 36/0033* (2013.01); *H04W 76/14* (2018.02); *H04W 88/04* (2013.01); *H04W 88/06* (2013.01)

(56) References Cited

U.S. PATENT DOCUMENTS

| | | | | |
|---|---|---|---|---|
| 2009/0265543 | A1* | 10/2009 | Khetawat | H04L 63/104 713/151 |
| 2011/0300807 | A1* | 12/2011 | Kwun | H04W 24/10 455/63.1 |
| 2012/0113887 | A1* | 5/2012 | Shen | H04W 36/0033 370/315 |
| 2013/0040683 | A1* | 2/2013 | Siomina | H04W 28/0236 455/517 |
| 2013/0088979 | A1* | 4/2013 | Bi | H04W 72/042 370/252 |
| 2013/0142070 | A1* | 6/2013 | Matsuo | H04W 40/02 370/252 |
| 2013/0287012 | A1* | 10/2013 | Pragada | H04W 76/22 370/338 |
| 2014/0348129 | A1* | 11/2014 | Yang | H04W 8/08 370/331 |
| 2014/0349694 | A1* | 11/2014 | Raghothaman | H04W 36/00 455/509 |
| 2015/0085740 | A1 | 3/2015 | Kalapatapu et al. | |
| 2015/0146662 | A1* | 5/2015 | Bi | H04W 28/0263 370/329 |
| 2015/0148062 | A1* | 5/2015 | Chen | H04W 60/00 455/456.1 |
| 2015/0155919 | A1* | 6/2015 | Bi | H04W 72/042 370/329 |
| 2015/0264580 | A1* | 9/2015 | Iwai | H04W 72/0406 370/329 |
| 2015/0282236 | A1 | 10/2015 | Chai et al. | |
| 2015/0373559 | A1* | 12/2015 | Hong | H04W 52/0206 370/329 |
| 2016/0044487 | A1* | 2/2016 | Li | H04W 8/20 370/328 |
| 2016/0142970 | A1* | 5/2016 | Chen | H04W 28/08 370/328 |
| 2016/0156404 | A1* | 6/2016 | Wolfner | H04B 7/15507 370/315 |
| 2016/0192422 | A1 | 6/2016 | Liu | |
| 2016/0205660 | A1* | 7/2016 | Ryu | H04W 36/30 455/458 |
| 2016/0212682 | A1* | 7/2016 | Chung | H04W 76/14 |
| 2016/0286449 | A1* | 9/2016 | Choi | H04W 36/18 |
| 2016/0309379 | A1* | 10/2016 | Pelletier | H04W 76/12 |
| 2016/0338140 | A1* | 11/2016 | Zhang | H04W 76/27 |
| 2016/0360441 | A1* | 12/2016 | Shi | H04W 28/04 |
| 2016/0381720 | A1* | 12/2016 | Baek | H04W 76/12 370/329 |
| 2017/0071023 | A1* | 3/2017 | Kunz | H04W 76/15 |
| 2017/0099690 | A1* | 4/2017 | Hooli | H04W 48/08 |
| 2018/0092017 | A1* | 3/2018 | Freda | H04W 36/36 |
| 2018/0206286 | A1* | 7/2018 | Pragada | H04W 76/25 |
| 2020/0177565 | A1* | 6/2020 | Watfa | H04L 63/0485 |

FOREIGN PATENT DOCUMENTS

| | | |
|---|---|---|
| CN | 104796849 A | 7/2015 |
| WO | 2013086316 A1 | 6/2013 |
| WO | 2015/005900 A1 | 1/2015 |
| WO | 2015/026200 A1 | 2/2015 |

OTHER PUBLICATIONS

Huawei, HiSilicon, "RAN2 considerations for D2D communication," 3GPP TSG RAN WG2, Meeting #83, Agenda Item: 7.5.2, Aug. 2013, R2-132757, 9 pgs.

CATT, "Considerations for service continuity for Prose one to one communication," SA WG2 Meeting #104, Agenda Item: 7.13, Jul. 2014, S2-142592, 4 pgs.

International Search Report dated May 11, 2016, in corresponding International Patent Application No. PCT/CN2015/086407, 4 pgs.

R2-152598 Kyocera, "Consideration of bearer mapping for ProSe UE-to-Network Relays", 3GPP TSG-RAN WG2 #90, Fukuoka, Japan, May 25-29, 2015, total 5 pages.

R2-153241 Huawei, HiSilicon, "UE-to-Network Relay connection establishment", 3GPP TSG-RAN WG2 #91, Beijing, China, Aug. 24-28, 2015, total 3 pages.

Japanese Notice of Allowance dated Feb. 5, 2019 in corresponding Japanese Patent Application No. 2018-506138 (2 pages).

"3rd Generation Partnership Project; Technical Specification Group Services and System Aspects; Study on extended architecture support for proximity-based services (Release 13)," 3GPP, TR 23.713, V1.5.0, Jul. 2015, XP050995819, 80 pgs.

Extended European Search Report dated Jun. 1, 2018, in corresponding European Patent Application No. 15900651.9, 9 pgs.

* cited by examiner

CONNECTION CONTROL APPARATUS AND METHOD

CROSS-REFERENCE TO RELATED APPLICATIONS

This application is a continuation of International Application No. PCT/CN2015/086407, filed on Aug. 7, 2015, the disclosure of which is hereby incorporated by reference in its entirety.

TECHNICAL FIELD

The present disclosure relates to the field of communications technologies, and in particular, to a connection control apparatus and method.

BACKGROUND

When a communications network is deployed, complete and seamless coverage of the network cannot be ensured. Especially when a natural disaster (such as an earthquake or a tsunami) occurs, a base station is usually damaged. As a result, communication between a terminal within a coverage area of the base station and the base station is interrupted.

A D2D (Device-to-Device) communication mode has been developed in recent years. In this D2D communication mode, user equipment directly communicates with another user equipment, and no base station or network is required for data transmission between the user equipment and the another user equipment. Therefore, disadvantages on an existing communications network can be avoided to some extent, such as small network signal coverage and possible communication interruption that occurs in a public safety (Public Safety) emergency.

FIG. 1 shows a deployment scenario of the D2D communication mode. UE a that is located outside a coverage area (an oval region shown in the figure) of a STA (Station, station) may perform D2D communication with UE x within the coverage area of the STA, so that the UE a may communicate with the UE x when the UE a cannot communicate with the STA.

In the D2D communication mode, when the UE a cannot communicate with the STA, the UE a may communicate with the UE x that is located within the coverage area of the STA, but the UE a cannot access a network by using the STA. For example, in a scenario of conventional cell communication, when the UE a is located within the coverage area of the STA, the UE a may establish a communication connection to the STA, and perform data transmission with the network by using the STA. A terminal usually has a moving capability. Therefore, when the UE a moves out from the coverage area of the STA, although the UE a may perform D2D communication with the UE x, the UE a cannot access the network by using the UE x. As a result, data transmission between the UE a and the network is interrupted, thereby affecting network service quality of the UE a.

SUMMARY

The present invention provides a connection control apparatus and method, to resolve a problem that a terminal cannot access, by using a STA, a network when the terminal performs D2D communication with a terminal within a coverage area of the STA.

To resolve the foregoing technical problem, embodiments of the present invention disclose the following technical solutions.

According to a first aspect, an apparatus is provided, including a receiving unit, a sending unit, and a processing unit, where the receiving unit is configured to receive a link configuration request message sent by a second terminal, where the link configuration request message carries context information of the second terminal, and the context information includes at least an identifier ID of the second terminal;

the sending unit is configured to send a bearer configuration request message to a network-side device according to the link configuration request message, where the bearer configuration request message includes a radio bearer modification request message or a bearer resource modification request message, the bearer configuration request message carries the context information, the bearer configuration request message is used to request the network-side device to configure a service bearer, and the service bearer is used to transmit service data of the second terminal;

the receiving unit is further configured to receive a bearer configuration complete message that is sent by the network-side device according to the bearer configuration request message, where the bearer configuration complete message carries an ID of the service bearer;

the processing unit is configured to establish a mapping relationship between the service bearer and the second terminal; and the sending unit is further configured to send a link configuration complete message to the second terminal after the mapping relationship is established, so that the second terminal performs data transmission with the network-side device over the service bearer by using the first terminal.

With reference to the first aspect, in a first possible implementation of the first aspect, when sending the bearer configuration request message to the network-side device according to the link configuration request message, the sending unit is specifically configured to:

send, according to the context information, a radio bearer modification request message to a first base station eNB that serves the first terminal, so that the first eNB configures a first radio bearer between the first eNB and the first terminal, where the first radio bearer is used to transmit the service data of the second terminal.

With reference to the first aspect, in a second possible implementation of the first aspect, when sending the bearer configuration request message to the network-side device according to the link configuration request message, the sending unit is specifically configured to:

send a bearer resource modification request message to a mobility management entity MME according to the context information, so that the MME configures a second S1 bearer between the first eNB and a serving gateway S-GW, and the MME controls the first eNB to configure a first radio bearer between the first eNB and the first terminal, where the second S1 bearer and the first radio bearer are used to transmit the service data of the second terminal.

With reference to the first or the second possible implementation of the first aspect, in a third possible implementation of the first aspect, when establishing the mapping relationship between the service bearer and the second terminal, the processing unit is specifically configured to:

establish a mapping relationship between an ID of the first radio bearer and the ID of the second terminal;

establish a mapping relationship between an ID of the first radio bearer and a first IP address, where the context information further includes the first IP address allocated by a data gateway P-GW to the second terminal; or allocate a second IP address to the second terminal, establish a mapping relationship between the first IP address and the second IP address, and establish a mapping relationship between an ID of the first radio bearer and the second IP address, where the context information further includes the first IP address allocated by a data gateway P-GW to the second terminal.

With reference to the first aspect, in a fourth possible implementation of the first aspect, the context information further includes an originally-accessed-cell ID of the second terminal;

the receiving unit is further configured to receive the originally-accessed-cell ID of the second terminal in the context information; and the sending unit is further configured to send the originally-accessed-cell ID of the second terminal to the first eNB.

According to a second aspect, an apparatus is provided, including a receiving unit, a sending unit, and a processing unit, where the receiving unit is configured to receive a radio bearer modification request message sent by a first terminal, where the radio bearer modification request message carries context information of a second terminal, and the context information includes at least an identifier ID of the second terminal;

the processing unit is configured to configure a first radio bearer between the first eNB and the first terminal according to the radio bearer modification request message, where the first radio bearer is used to transmit service data of the second terminal;

the processing unit is further configured to search an existing S1 bearer of the first eNB for a first S1 bearer that is corresponding to the ID of the second terminal;

the processing unit is further configured to establish a mapping relationship between the first radio bearer and the first S1 bearer; and the sending unit is configured to send a bearer configuration complete message to the first terminal after the mapping relationship is established, where the bearer configuration complete message carries an ID of the first radio bearer.

With reference to the second aspect, in a first possible implementation of the second aspect, when configuring the first radio bearer between the first eNB and the first terminal, the processing unit is specifically configured to:

configure an existing radio bearer between the first eNB and the first terminal as the first radio bearer, where the existing radio bearer is used to transmit service data of another second terminal; or establish the first radio bearer between the first eNB and the first terminal.

With reference to the second aspect or the first possible implementation of the second aspect, in a second possible implementation of the second aspect, the method further includes:

the receiving unit is further configured to receive an originally-accessed-cell ID of the second terminal sent by the first terminal; and the processing unit is further configured to: when an ID of the first eNB is the same as the originally-accessed-cell ID, configure the first radio bearer between the first eNB and the first terminal according to the radio bearer modification request message; or the sending unit is further configured to: when an ID of the first eNB is different from the originally-accessed-cell ID, send a handover request message to a source eNB that is corresponding to the originally-accessed-cell ID, the receiving unit is further configured to receive a handover acknowledgment message sent by the source eNB, and the processing unit is further configured to: when the handover acknowledgment message is received, configure the first radio bearer between the first eNB and the first terminal according to the radio bearer modification request message.

According to a third aspect, an apparatus is provided, including a receiving unit, a sending unit, and a processing unit, where the receiving unit is configured to receive a bearer resource modification request message sent by a first terminal, where the bearer resource modification request message carries context information of a second terminal, and the context information includes at least an identifier ID of the second terminal;

the processing unit is configured to configure a second S1 bearer between the first eNB and a serving gateway S-GW according to the bearer resource modification request message, where the second S1 bearer is used to transmit service data of the second terminal; and the sending unit is configured to send a bearer resource command message to the first eNB according to the bearer resource modification request message, so that the first eNB configures a first radio bearer between the first eNB and the first terminal, where the first radio bearer is used to transmit the service data of the second terminal.

With reference to the third aspect, in a first possible implementation of the third aspect, the processing unit is further configured to allocate an identifier of the second S1 bearer to the second terminal;

the sending unit is further configured to send a bearer resource command message to the S-GW, where the bearer resource command message carries the identifier of the second S1 bearer;

the receiving unit is further configured to receive a bearer creation request message sent by the S-GW;

the sending unit is further configured to send an E-RAB modification request message to the first eNB according to the bearer creation request message;

the receiving unit is further configured to receive an E-RAB bearer setting modification response message that is sent by the first eNB according to the E-RAB modification request message; and the sending unit is further configured to send a bearer creation response message to the S-GW according to the E-RAB bearer setting modification response message, so as to establish the second S1 bearer between the S-GW and the first eNB.

According to a fourth aspect, a connection control method is provided, and the method includes:

receiving, by a first terminal, a link configuration request message sent by a second terminal, where the link configuration request message carries context information of the second terminal, and the context information includes at least an identifier ID of the second terminal;

sending, by the first terminal, a bearer configuration request message to a network-side device according to the link configuration request message, where the bearer configuration request message includes at least a radio bearer modification request message or a bearer resource modification request message, the bearer configuration request message carries the context information, the bearer configuration request message is used to request the network-side device to configure a service bearer, and the service bearer is used to transmit service data of the second terminal;

receiving, by the first terminal, a bearer configuration complete message that is sent by the network-side device according to the bearer configuration request message, where the bearer configuration complete message carries an ID of the service bearer;

establishing, by the first terminal, a mapping relationship between the service bearer and the second terminal; and sending, by the first terminal, a link configuration complete message to the second terminal after establishing the mapping relationship, so that the second terminal performs data transmission with the network-side device over the service bearer by using the first terminal.

With reference to the fourth aspect, in a first possible implementation of the fourth aspect, the sending, by the first terminal, a bearer configuration request message to a network-side device according to the link configuration request message includes:

sending, by the first terminal according to the context information, a radio bearer modification request message to a first base station eNB that serves the first terminal, so that the first eNB configures a first radio bearer between the first eNB and the first terminal, where the first radio bearer is used to transmit the service data of the second terminal.

With reference to the fourth aspect, in a second possible implementation of the fourth aspect, the sending, by the first terminal, a bearer configuration request message to a network-side device according to the link configuration request message includes:

sending, by the first terminal, a bearer resource modification request message to a mobility management entity MME according to the context information, so that the MME configures a second S1 bearer between the first eNB and a serving gateway S-GW, and the MME controls the first eNB to configure a first radio bearer between the first eNB and the first terminal, where the second S1 bearer and the first radio bearer are used to transmit the service data of the second terminal.

With reference to the first or the second possible implementation of the fourth aspect, in a third possible implementation of the fourth aspect, the establishing, by the first terminal, a mapping relationship between the service bearer and the second terminal includes:

establishing, by the first terminal, a mapping relationship between an ID of the first radio bearer and the ID of the second terminal;

establishing, by the first terminal, a mapping relationship between an ID of the first radio bearer and a first IP address, where the context information further includes the first IP address allocated by a data gateway P-GW to the second terminal; or allocating, by the first terminal, a second IP address to the second terminal, establishing a mapping relationship between the first IP address and the second IP address, and establishing a mapping relationship between an ID of the first radio bearer and the second IP address, where the context information further includes the first IP address allocated by a P-GW to the second terminal.

With reference to the fourth aspect, in a fourth possible implementation of the fourth aspect, the context information further includes an originally-accessed-cell ID of the second terminal, and the method further includes:

receiving, by the first terminal, the originally-accessed-cell ID of the second terminal in the context information; and sending, by the first terminal, the originally-accessed-cell ID of the second terminal to the first eNB.

According to a fifth aspect, a connection control method is provided, and the method includes:

receiving, by a first base station eNB, a radio bearer modification request message sent by a first terminal, where the radio bearer modification request message carries context information of a second terminal, and the context information includes at least an identifier ID of the second terminal;

configuring, by the first eNB, a first radio bearer between the first eNB and the first terminal according to the radio bearer modification request message, where the first radio bearer is used to transmit service data of the second terminal;

searching, by the first eNB, an existing S1 bearer of the first eNB for a first S1 bearer that is corresponding to the ID of the second terminal;

establishing, by the first eNB, a mapping relationship between the first radio bearer and the first S1 bearer; and sending, by the first eNB, a bearer configuration complete message to the first terminal after establishing the mapping relationship, where the bearer configuration complete message carries an ID of the first radio bearer.

With reference to the fifth aspect, in a second possible implementation of the fifth aspect, the configuring, by the first eNB, a first radio bearer between the first eNB and the first terminal includes:

configuring, by the first eNB, an existing radio bearer between the first eNB and the first terminal as the first radio bearer, where the existing radio bearer is used to transmit service data of another second terminal; or establishing, by the first eNB, the first radio bearer between the first eNB and the first terminal.

With reference to the fifth aspect or the first possible implementation of the fifth aspect, in a second possible implementation of the fifth aspect, the method further includes:

receiving an originally-accessed-cell ID of the second terminal sent by the first terminal; and when an ID of the first eNB is the same as the originally-accessed-cell ID, configuring, by the first eNB, the first radio bearer between the first eNB and the first terminal according to the radio bearer modification request message; or when an ID of the first eNB is different from the originally-accessed-cell ID, sending, by the first eNB, a handover request message to a source eNB that is corresponding to the originally-accessed-cell ID; and when receiving a handover acknowledgment message sent by the source eNB, configuring, by the first eNB, the first radio bearer between the first eNB and the first terminal according to the radio bearer modification request message.

According to a sixth aspect, a connection control method is provided, and the method includes:

receiving, by a mobility management entity MME, a bearer resource modification request message sent by a first terminal, where the bearer resource modification request message carries context information of a second terminal, and the context information includes at least an identifier ID of the second terminal;

configuring, by the MME, a second S1 bearer between the first eNB and a serving gateway S-GW according to the bearer resource modification request message, where the second S1 bearer is used to transmit service data of the second terminal; and sending, by the MME, a bearer resource command message to the first eNB according to the bearer resource modification request message, so that the first eNB configures a first radio bearer between the first eNB and the first terminal, where the first radio bearer is used to transmit the service data of the second terminal.

With reference to the sixth aspect, in a first possible implementation of the sixth aspect, the configuring a second S1 bearer between the first eNB and an S-GW includes:

allocating, by the MME, an identifier of the second S1 bearer to the second terminal;

sending, by the MME, a bearer resource command message to the S-GW, where the bearer resource command message carries the identifier of the second S1 bearer;

receiving, by the MME, a bearer creation request message sent by the S-GW;

sending, by the MME, an E-UTRAN radio access bearer E-RAB modification request message to the first eNB according to the bearer creation request message;

receiving, by the MME, an E-RAB bearer setting modification response message that is sent by the first eNB according to the E-RAB modification request message; and sending, by the MME, a bearer creation response message to the S-GW according to the E-RAB bearer setting modification response message, so as to establish the second S1 bearer between the S-GW and the first eNB.

The technical solutions provided in the present invention can have the following beneficial effects:

According to the method provided in the present invention, the first terminal receives the link configuration request from the second terminal, and may request the network-side device to configure a service bearer for the second terminal, so that the second terminal may perform data transmission with the network-side device over the service bearer by using the first terminal.

According to the method, when performing D2D communication with the first terminal, the second terminal can access a network by using the first terminal, to perform data transmission. In this way, when the second terminal cannot directly access a base station, network service quality of the second terminal can be improved by using the first terminal.

It should be understood that the foregoing general description and the following detailed description are merely examples for explanation, and are not intended to limit the present invention.

BRIEF DESCRIPTION OF DRAWINGS

The accompanying drawings in the specification that are a part of this application are used for further understanding of the present invention. Example embodiments in the present invention and description thereof are for explanation in the present invention, and do not constitute any inappropriate limitation to the present invention. In the accompanying drawings.

To describe the technical solutions in the embodiments of the present invention or in the prior art more clearly, the following briefly describes the accompanying drawings required for describing the embodiments or the prior art. Apparently, a person of ordinary skill in the art may still derive other drawings from these accompanying drawings without creative efforts.

DESCRIPTION OF EMBODIMENTS

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A connection control method provided in the embodiments of the present invention can be applied to an LTE (Long Term Evolution, Long Term Evolution) communications system, such as a TD-LTE (Time Division Long Term Evolution, time division long term evolution) system or an FDD-LTE (Frequency Division Dual Long Term Evolution, frequency division duplex long term evolution) system, or can be applied to another communications system, such as a WCDMA (Wideband Code Division Multiple Access, Wideband Code Division Multiple Access) system, a TD-SCDMA (Time Division-Synchronous Code Division Multiple Access, Time Division-Synchronous Code Division Multiple Access) system, and GSM (Global System for Mobile Communication, Global System for Mobile Communications). The plurality of systems enumerated above are merely examples for description in the embodiments of the present invention, and the method provided in the present invention can also be applied to another suitable communications system. No limitation is set thereto in the present invention.

Figure 1:
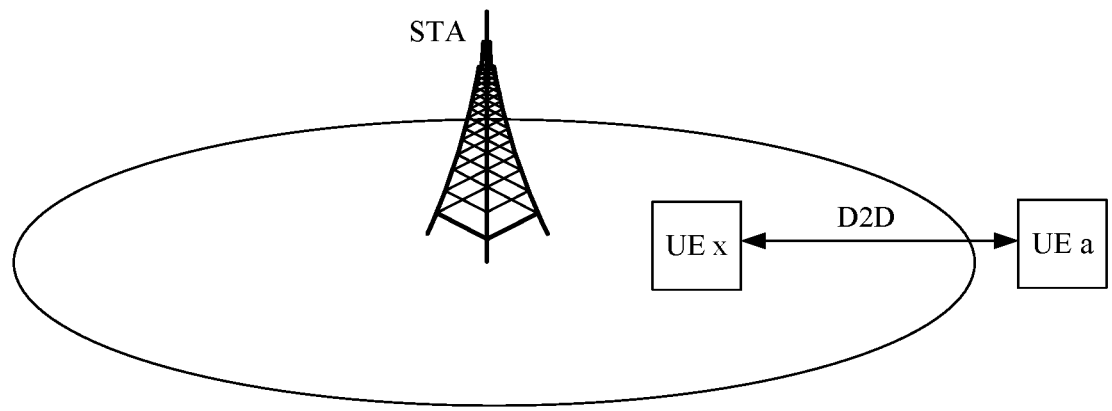
FIG. 1 is a diagram of a deployment scenario in which a D2D communication mode is used.
Figure 2:
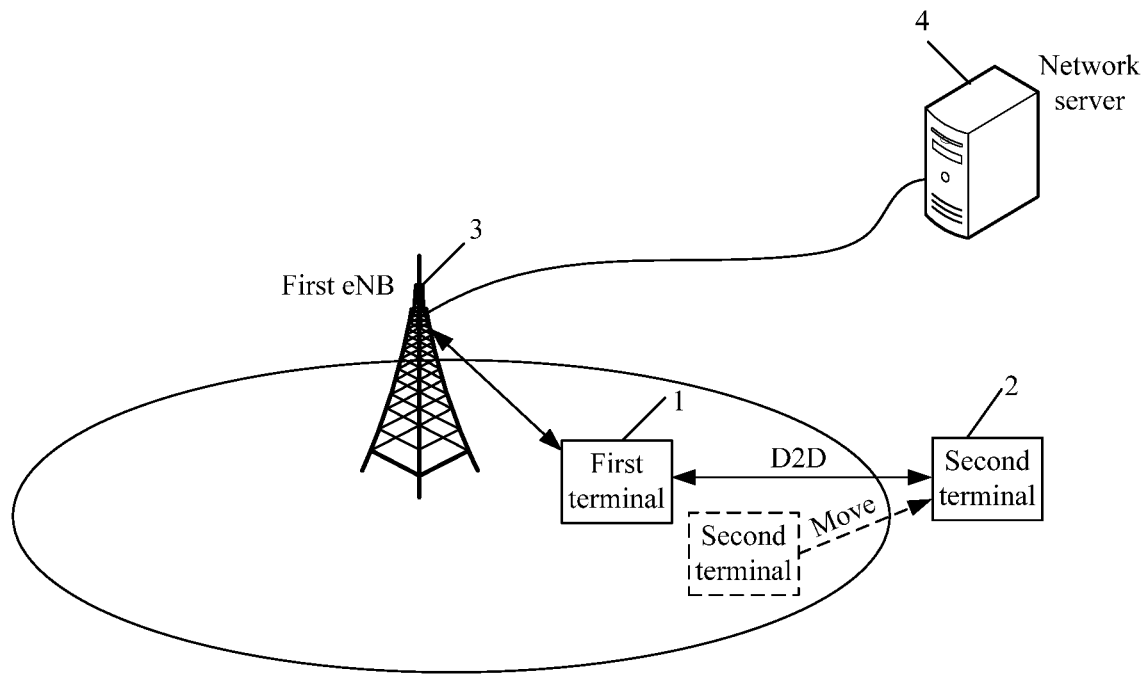
FIG. 2 is a schematic diagram of a network architecture to which a connection control method can be applied according to an embodiment of the present invention.

An LTE communications system is used as an example for description in the embodiments of the present invention. FIG. 2 is a schematic diagram of a network architecture to which a connection control method can be applied according to an embodiment of the present invention. Referring to FIG. 2, a first terminal 1, a second terminal 2, and a first eNB (evolved NodeB, evolved NodeB) 3 are included in the figure. The first terminal 1 is located within a coverage area of the first eNB 3, the second terminal 2 moves out from the coverage area of the first eNB 3, and the first terminal 1 and the second terminal 2 may perform D2D communication. The first eNB 3 is connected to a network server 4, and the network server 4 may be any one of an MME (Mobility Management Entity, mobility management entity), an S-GW (Serving GateWay, serving gateway), or a P-GW (Public Data Network GateWay, public data network gateway). In this embodiment of the present invention, a network-side device is a peer network device of a terminal in a communications network. Both the first eNB 3 and the network server 4 shown in FIG. 2 may be referred to as a network-side device.

Figure 3:
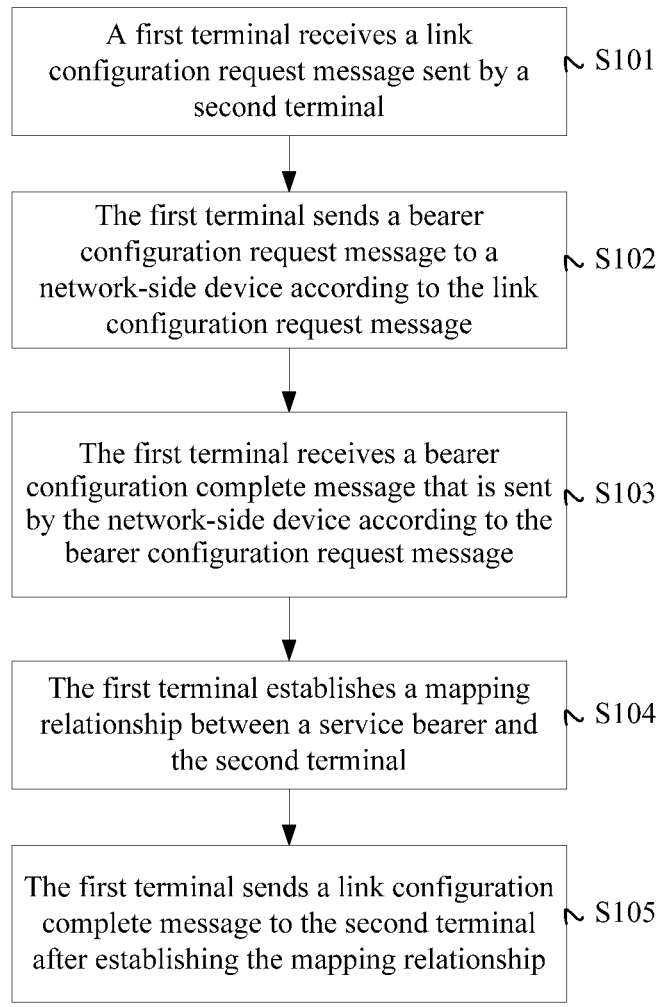
FIG. 3 is a schematic flowchart of a connection establishment method according to an embodiment of the present invention.

A first terminal is used as an example below to describe a connection control method according to an embodiment of the present invention. As shown in FIG. 3, the connection establishment method includes the following steps.

S101: A first terminal receives a link configuration request message sent by a second terminal.

The first terminal and the second terminal can perform D2D communication, and therefore, in this step, the second terminal may send the link configuration request message to the first terminal in a D2D communication mode. The link configuration request message is used to request to establish, between the first terminal and a network device, a communication connection for transmitting service data of the second terminal.

In this embodiment of the present invention, after a trigger condition is satisfied, the second terminal may determine to connect to the first terminal, that is, perform D2D communication with the first terminal. The trigger condition may be as follows: An RLF (Radio Link Failure, radio link failure) occurs on the second terminal, quality of a signal between the second terminal and an eNB is lower than a threshold, the second terminal is at an edge of a cell, or the like.

Before performing D2D communication, the second terminal first initiates a direct communication establishment request to the first terminal. If the first terminal accepts the D2D communication connection establishment request of the first terminal, the first terminal sends, to the second terminal, a D2D communication establishment response message including configuration information for completing D2D communication. After receiving the D2D communication establishment configuration information and completing configuration, the second terminal sends a D2D communication setting complete message to the first terminal. In this embodiment of the present invention, the link configuration request message may be the direct communication establishment request message sent by the second terminal or the D2D communication setting complete message sent by the second terminal.

In this embodiment of the present invention, the link configuration request message may carry context information of the second terminal. The context information of the second terminal is parameter information, such as an identifier ID of the second terminal, used by the second terminal to establish a communications link with a network-side device when the second terminal is within a coverage area of a base station that the second terminal originally accesses. The identifier ID of the second terminal may be an ID of the second terminal stored in an eNB, or an ID of the second terminal stored in an MME, an S-GW, or a P-GW, and the ID of the second terminal stored in the first eNB may be different from the ID of the second terminal stored in the MME, the S-GW, or the P-GW. The ID of the second terminal stored in the first eNB may be a C-RNTI (Cell Radio Network Temporary Identifier, cell radio network temporary identifier), and the ID of the second terminal stored in the MME, the S-GW, or the P-GW may be an IMEI (International Mobile Equipment Identity, international mobile equipment identity), a TMSI (Temporary Mobile Subscriber Identity, temporary mobile subscriber identity), or an IMSI (International Mobile Subscriber Identification Number, international mobile subscriber identity). An originally-accessed-cell identifier ID of the second terminal may be an ECGI (E-UTRAN Cell Global Identifier, evolved universal terrestrial radio access network cell global identifier).

In addition, in another embodiment, the context information may alternatively carry a parameter such as the originally-accessed-cell identifier ID of the second terminal or a first IP address allocated by a P-GW to the second terminal.

S102: The first terminal sends a bearer configuration request message to a network-side device according to the link configuration request message.

In this embodiment of the present invention, the bearer configuration request message includes at least a radio bearer modification request message or a bearer resource modification request message. The bearer configuration request message usually carries the context information of the second terminal. The bearer configuration request message is used to request the network-side device to configure a service bearer, and the service bearer is used to transmit the service data of the second terminal.

The service bearer refers to a link that may be used by the second terminal to access a network by using the first terminal. In an embodiment, when the network-side device is the first eNB, the service bearer may be a radio bearer between the first terminal and the first eNB. In a specific embodiment, the radio bearer may also be referred to as an end-to-end (End—to End) bearer. Correspondingly, step S102 may include the following step:

sending, according to the context information, a radio bearer modification request message (Radio Bearer Modification Request) to the first base station eNB that serves the first terminal, so as to send the bearer configuration request message to the first base station eNB that serves the first terminal.

After receiving the radio bearer modification request message, the first eNB configures a first radio bearer between the first eNB and the first terminal for the second terminal, and uses the first radio bearer as the service bearer for transmitting the service data of the second terminal.

In another embodiment, when the network-side device is an MME, the service bearer may be a radio bearer between the first terminal and the first eNB and an S1 bearer that is corresponding to an EPS (Evolved Packet System, evolved packet system) bearer between the first eNB and an S-GW. That is, the service bearer is a link formed by both the radio bearer and the S1 bearer. Correspondingly, step S102 may include the following step:

sending a bearer resource modification request message (Request Bearer Resource Modification) to the mobility management entity MME according to the context information.

After receiving the bearer resource modification request message, the MME configures a second S1 bearer between a first eNB and an S-GW for the second terminal, and the MME controls the first eNB to configure a first radio bearer between the first eNB and the first terminal, and uses the configured second S1 bearer and the first radio bearer as the service bearer for transmitting the service data of the second terminal. In addition, under the control of the network, a bearer between the S-GW and the P-GW may be referred to as an S5/S8 bearer, and the S5/S8 is established in a process of establishing the S1 bearer. In the following, unless otherwise specified, when an S1 bearer is established, an S5/S8 bearer that is corresponding to the S1 bearer is also established by default.

S103: The first terminal receives a bearer configuration complete message that is sent by the network-side device according to the bearer configuration request message.

When receiving the bearer update request, the network-side device configures, for the second terminal, the service bearer used to access the network by using the first terminal. After completing configuration, the network-side device generates the bearer configuration complete message and sends the bearer configuration complete message to the first terminal. The bearer configuration complete message carries an ID of the service bearer, such as an ID of the first radio bearer between the first terminal and the first eNB.

S104: The first terminal establishes a mapping relationship between a service bearer and the second terminal.

After determining that the network-side device completes configuring the service bearer for the second terminal, the first terminal locally establishes the mapping relationship between the service bearer and the second terminal, so that the first terminal may perform data transmission according to the mapping relationship when receiving and transmitting data. For example, in an uplink data transmission stage, the first terminal may send uplink data of the second terminal over the service bearer; in a downlink data transmission stage, the first terminal may send, to the second terminal over the service bearer, downlink data destined for the second terminal, so as to implement data transmission between the second terminal and the network.

S105: The first terminal sends a link configuration complete message to the second terminal after establishing the mapping relationship.

The link configuration complete message is mainly used to inform the second terminal that the service bearer has been configured, and indicates that the second terminal may perform data transmission with the network-side device over the service bearer by using the first terminal.

According to the method provided in this embodiment of the present invention, the first terminal receives the link configuration request message from the second terminal, and may request the network-side device to configure the service bearer for the second terminal, so that the second terminal may perform data transmission with the network-side device over the service bearer by using the first terminal.

In this embodiment of the present invention, regardless of whether the service bearer is the first radio bearer between the first terminal and the first eNB or a link that is formed by both the first radio bearer between the first terminal and the first eNB and the second S1 bearer between the first eNB and the gateway, when a bonding relationship between the service bearer and the second terminal is established, the ID of the first radio bearer may be used to represent the ID of the service bearer.

In an embodiment of the present invention, step S104 in the embodiment shown in FIG. 3 may include the following steps:

establishing, by the first terminal, a mapping relationship between an ID of the first radio bearer and the ID of the second terminal;

establishing, by the first terminal, a mapping relationship between an ID of the first radio bearer and a first IP address, where the context information further includes the first IP address allocated by the data gateway P-GW to the second terminal; or allocating, by the first terminal, a second IP address to the second terminal, establishing a mapping relationship between a first IP address and the second IP address, and establishing a mapping relationship between an ID of the first radio bearer and the second IP address, where the context information further includes the first IP address allocated by the data gateway P-GW to the second terminal.

If the first terminal allocates the second IP address to the second terminal, when the first terminal and the second terminal perform data transmission, the second IP address is used as an IP address of the second terminal all the time, whereas between the first terminal and the S-GW, the first IP address is still used as an IP address of the second terminal. Therefore, when the second terminal uses the second IP address to perform data transmission with the network, with respect to uplink data, the method may further include the following steps.

S11: The first terminal receives uplink data whose source IP address is the second IP address and that is sent by the second terminal.

The uplink data of the second terminal is sent by the second terminal to the first terminal by means of D2D communication. The first terminal has allocated a new IP address, that is, the second IP address, to the second terminal. Therefore, the second terminal directly uses the second IP address as the source IP address when sending the uplink data.

S12: The first terminal replaces the source IP address of the uplink data with the first IP address.

The second IP address is used only when the first terminal and the second terminal perform data transmission. Therefore, when the first terminal needs to send the uplink data of the second terminal to the network, the first IP address that is allocated by the gateway to the second terminal still needs to be used, so that the second terminal can be identified by the gateway.

S13: The first terminal sends, to the first eNB over the first radio bearer mapping the second IP address, the uplink data whose source IP address is replaced.

When the second terminal uses the second IP address to perform data transmission with the network, with respect to downlink data, the method may further include the following steps.

S14: The first terminal receives, over the first radio bearer mapping the second IP address, downlink data that is destined for the second terminal and whose destination IP address is the first IP address.

The downlink data is delivered by the first eNB to the second terminal over the first radio bearer. On the network, the second terminal can be determined only by using the first IP address allocated by the gateway to the second terminal.

S15: The first terminal replaces the destination IP address of the downlink data with the second IP address.

The second IP address is used only when the first terminal and the second terminal perform data transmission. Therefore, when the first terminal needs to send, to the second terminal, the downlink data destined for the second terminal, the destination IP address in the downlink data needs to be replaced with the second IP address, so that the second terminal can be accurately found according to the second IP address.

S16: The first terminal sends, to the second terminal, the downlink data whose destination IP address is replaced.

In another embodiment of the present invention, the context information of the second terminal may further include an originally-accessed-cell ID of the second terminal. Therefore, the method may further include the following steps:

receiving, by the first terminal, the originally-accessed-cell ID of the second terminal in the context information; and sending, by the first terminal, the originally-accessed-cell ID of the second terminal to the first eNB.

According to this step, the first eNB can learn of the originally-accessed-cell ID of the second terminal.

A first eNB is used as an example below to describe a connection control method according to an embodiment of the present invention.

Figure 4:
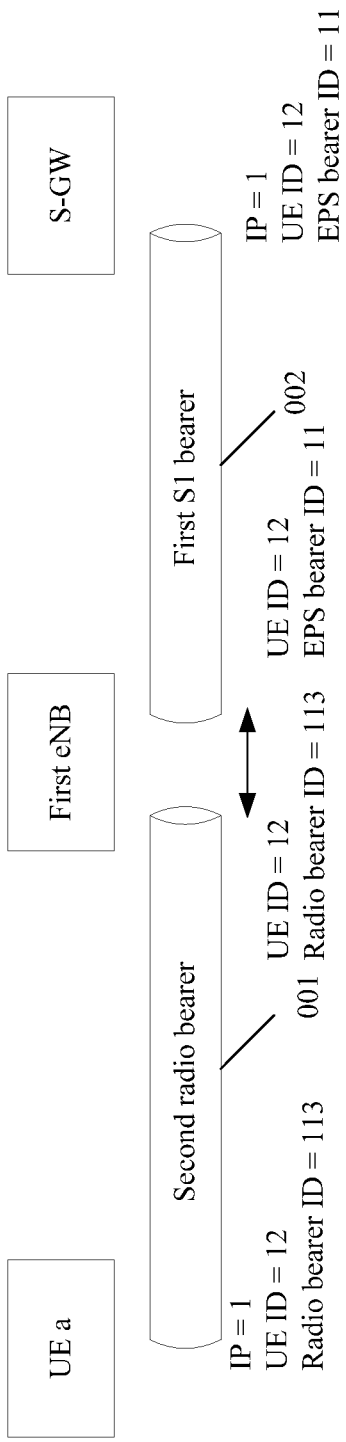
FIG. 4 is a schematic diagram of a bearer mapping method according to an embodiment of the present invention.

In this embodiment of the present invention, referring to FIG. 2, the first terminal 1 is located within the coverage area of the first eNB 3, and the second terminal 2 moves out from the coverage area of the first eNB 3. In addition, in this embodiment of the present invention, a first terminal may be referred to as relay UE, and the second terminal may be referred to as remote UE. With reference to FIG. 2, when the second terminal 2 is within the coverage area of the first eNB 3, referring to FIG. 4, the second terminal is represented by UE a, and the first terminal is represented by relay UE. It can be seen that there is a second radio bearer 001 between the UE a and the first eNB, and there is a first S1 bearer 002, mapping the second radio bearer 001, between the first eNB and an S-GW. In addition, in FIG. 4, an IP address allocated by a P-GW to the UE a is IP=1, a radio bearer ID may be used as an ID of the second radio bearer, and an EPS bearer ID may be used as an ID of the first S1 bearer.

Figure 5:
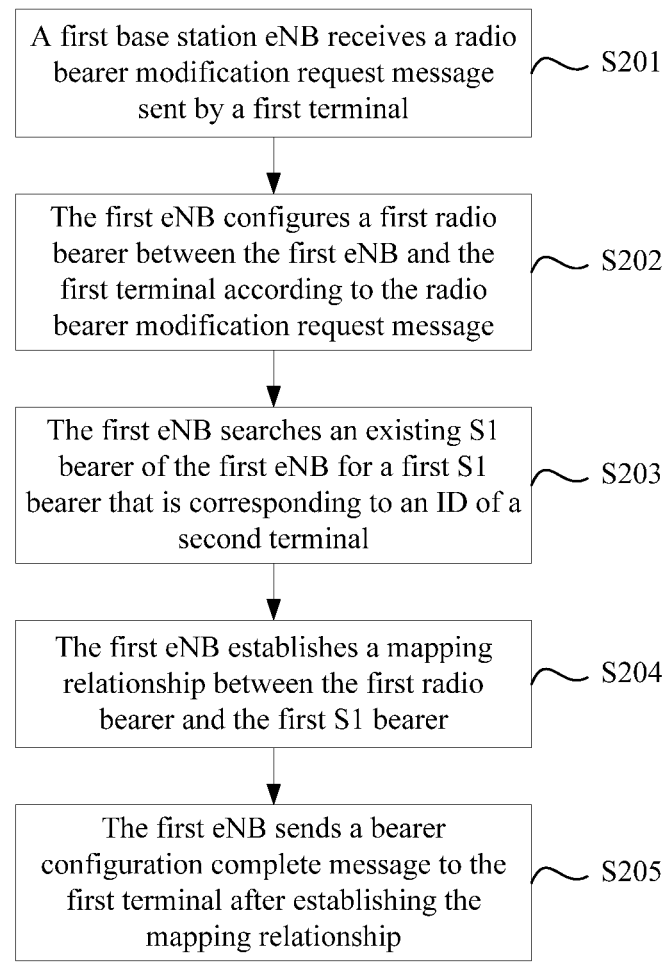
FIG. 5 is a schematic flowchart of another connection establishment method according to an embodiment of the present invention.

As shown in FIG. 5, the connection control method includes the following steps.

S201: A first base station eNB receives a radio bearer modification request message sent by a first terminal.

The radio bearer modification request message carries context information of a second terminal, and the context information includes at least an ID of the second terminal.

S202: The first eNB configures a first radio bearer between the first eNB and the first terminal according to the radio bearer modification request message.

The first radio bearer is used to transmit service data of the second terminal. A specific configuration manner of the first radio bearer is a technology commonly known by a person skilled in the art, and details are not described herein.

S203: The first eNB searches an existing S1 bearer of the first eNB for a first S1 bearer that is corresponding to an ID of a second terminal.

Referring to FIG. 2, if the second terminal moves out from the coverage area of the first eNB, before the second terminal moves out the coverage area of the first eNB, that is, is located within the coverage area of the first eNB, the second terminal may access a network by using the first eNB. Therefore, there is a first EPS bearer, configured for the second terminal to access the network, of the first eNB, and the first EPS bearer may be referred to as a historical EPS bearer of the first eNB for the second terminal, herein. In this specification, an EPS bearer includes a radio bearer, an S1 bearer, and an S5/S8 bearer. An identifier of the EPS bearer is stored in a device such as a terminal device, an eNB, an MME, an S-GW, or a P-GW. Therefore, a radio bearer, an S1 bearer, or an S5/S8 bearer may be uniquely determined according to the identifier of the EPS bearer.

In this embodiment of the present invention, step S203 may include the following steps: extracting, by the first eNB, the ID of the second terminal from the context information; and searching all existing S1 bearers of the first eNB for a first S1 bearer that is corresponding to the ID of the second terminal and an identifier of an EPS bearer.

S204: The first eNB establishes a mapping relationship between the first radio bearer and the first S1 bearer In this embodiment of the disclosure, the mapping relationship may be a mapping relationship between an ID of the first radio bearer and an ID of the first S1 bearer. After establishing the mapping relationship, the first eNB may map, onto the first S1 bearer, uplink data that is transmitted by the second terminal over the first radio bearer, and then send the uplink data to the network over the first S1 bearer and an S5/S8 bearer. In addition, the first eNB may also map, onto the first radio bearer, downlink data that belongs to the second terminal and that is received over the first S1 bearer, and then send the downlink data to the second terminal by using the first radio bearer and the first terminal, so as to implement data transmission between the second terminal and the network.

S205: The first eNB sends a bearer configuration complete message to the first terminal after establishing the mapping relationship.

The bearer configuration complete message carries the ID of the first radio bearer. The first terminal may be informed, by using the bearer configuration complete message, that the first radio bearer has been configured.

Figure 6:
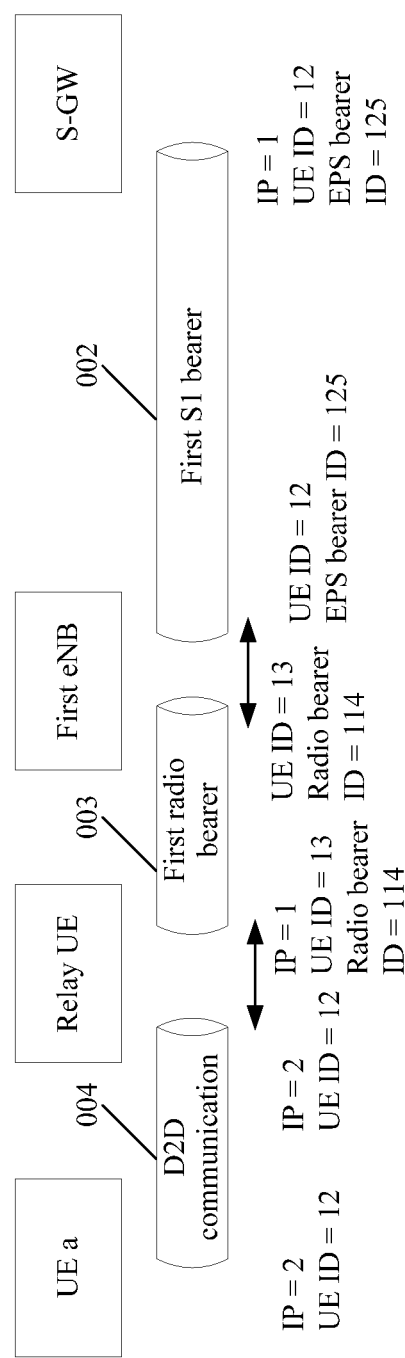
FIG. 6 is a schematic diagram of another bearer mapping method according to an embodiment of the present invention.

Referring to FIG. 6, there is D2D communication 004 between a second terminal 2 and a first terminal 1, and there is a first radio bearer 003, used to transmit service data of the second terminal 2, between the first terminal 1 and a first eNB 3. In actual application, there is a logical link between the second terminal 2 and the first terminal 1. FIG. 6 is merely for an illustrative purpose, and does not constitute limitation to this application.

It can be seen from FIG. 6 that the second terminal 2 may perform data transmission with a gateway by using the first radio bearer 003 and a first S1 bearer 002.

In this embodiment of the present invention, for the second terminal that moves out from a coverage area of the first eNB, the first eNB may configure the first radio bearer between the first eNB and the first terminal that is within the coverage area of the first eNB, and send, to the second terminal by using the first radio bearer and the first terminal, downlink data that is delivered to the second terminal by using the network. In addition, the first eNB receives, over the first radio bearer, uplink data that is sent by the second terminal by using the first terminal, and sends the uplink data to a device such as the gateway, so that the second terminal performs data transmission with the network.

In this embodiment of the present invention, the second terminal moves out from the coverage area of the first eNB, and the first S1 bearer for the second terminal is maintained between the first eNB and the gateway. Therefore, the second terminal may still access the first eNB that the second terminal originally accesses. This can shorten a delay caused in a process such as a connection establishment process or a subscriber verification process, and reduce time required by the second terminal to access the network.

In this embodiment of the present invention, the first terminal that serves as relay UE may simultaneously perform D2D communication with one or more second terminals that serve as remote UE. This means that the first terminal may need to simultaneously provide network access services to a plurality of second terminals.

In a specific embodiment, a radio bearer may be configured for each second terminal, to be used by each second terminal to perform data transmission. Therefore, in step S202, the first eNB may configure the first radio bearer for the second terminal in the following manner:

establishing, by the first eNB, a new first radio bearer between the first eNB and the first terminal.

In other words, in this embodiment, a first radio bearer is established between the first eNB and the first terminal for each second terminal. In this way, the established first radio bearer is specific to one second terminal, and is used to transmit service data of the second terminal. FIG. 6 shows a schematic diagram of data transmission (FIG. 6 shows only a case in which there is one second terminal UE a, and data transmission of another second terminal is similar to that of the UE a). In addition, in FIG. 6, an IP address allocated by a P-GW to the UE a is IP=1, and an IP address allocated by the relay UE to the UE a is IP=2. For details about a subsequent data transmission process, reference may be made to the description of step S11 to step S13 and step S21 and step S23.

Figure 7:
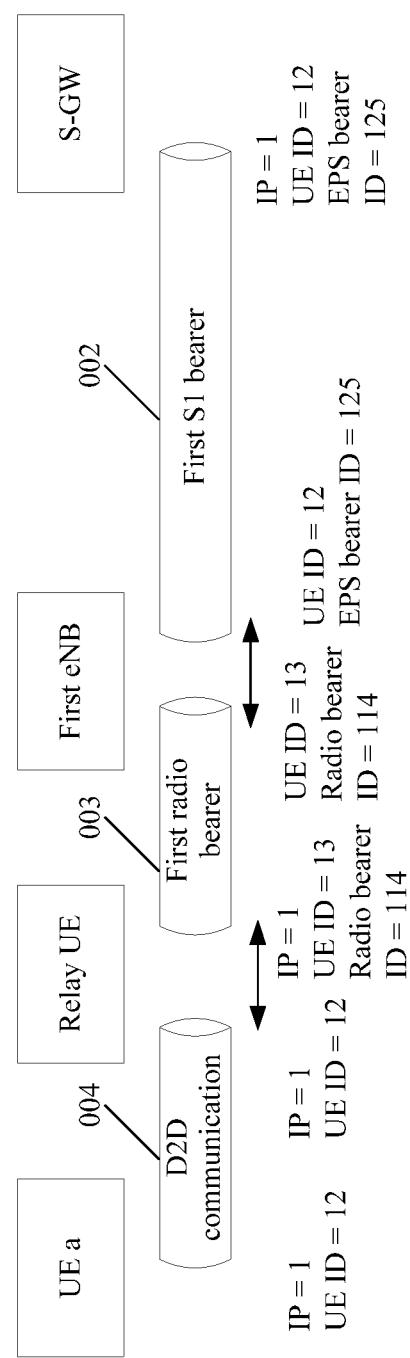
FIG. 7 is a schematic diagram of still another bearer mapping method according to an embodiment of the present invention.

In another embodiment, as shown in FIG. 7, in FIG. 7, the relay UE continues to use the IP address of the UE a. Therefore, in the data transmission process, all source IP addresses of uplink data from the UE a are IP=1, and all destination IP addresses of downlink data destined for the UE a are IP=1.

In another embodiment, alternatively, at least two second terminals share one radio bearer. Therefore, in step S202, the first eNB may configure the first radio bearer for the second terminal in the following manner:

configuring, by the first eNB, an existing radio bearer between the first eNB and the first terminal as the first radio bearer.

Figure 8:
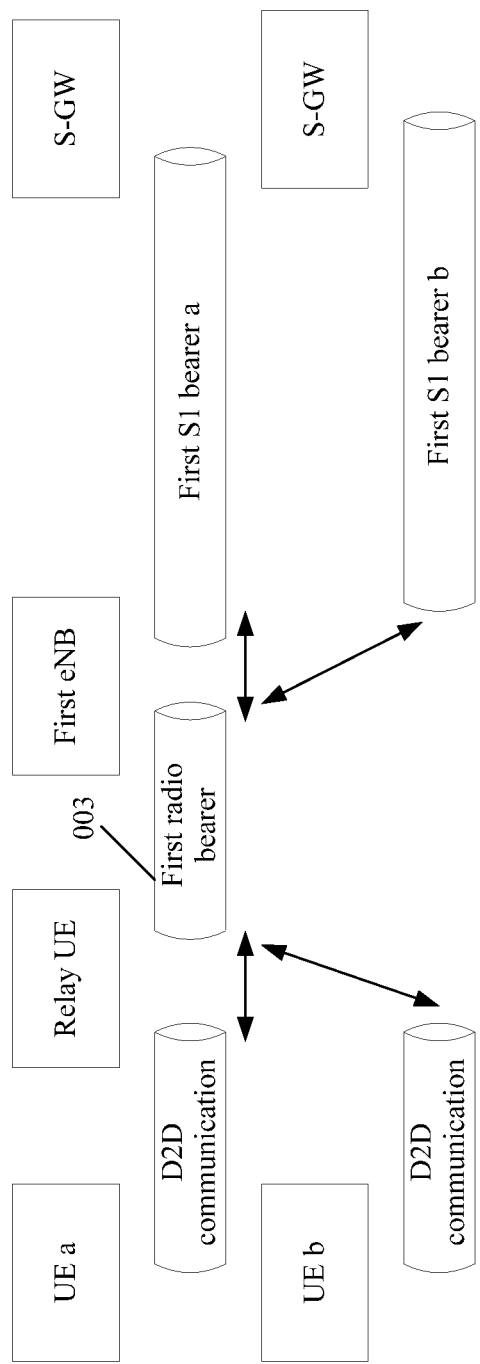
FIG. 8 is a schematic diagram of yet another bearer mapping method according to an embodiment of the present invention.

Herein, the existing radio bearer is used to transmit service data of another second terminal. That is, in this embodiment, after a radio bearer is established between the first eNB and the first terminal for the another second terminal, when a first radio bearer is configured for a subsequent second terminal, the existing radio bearer may be allocated to the subsequent second terminal. As shown in FIG. 8, in the figure, a first radio bearer 003 may be shared by a plurality of second terminals. In FIG. 8, another second terminal may be represented by UE b. Correspondingly, first S1 bearers corresponding to all second terminals are distinguished by using letters. That is, UE a is corresponding to a first S1 bearer a, and the UE b is corresponding to a first S1 bearer b.

In addition, when the existing radio bearer is used as the first radio bearer, the second terminal may share a first radio bearer that has a same quality of service requirement as that of the second terminal. That is, a plurality of existing radio bearers with different quality of service requirements are established in advance, and when a first radio bearer is configured for the subsequent second terminal, an existing radio bearer that has a same quality of service requirement as that of the second terminal may be selected as the first radio bearer. That is, different second terminals may share a first radio bearer that has a same quality of service requirement as those of the second terminals. Therefore, in step S202, the first eNB may configure the first radio bearer for the second terminal in the following manner:

using a radio bearer that is between the first eNB and the first terminal and that has a same quality of service requirement as that of the second terminal as the first radio bearer; and if there is no radio bearer that is between the first eNB and the first terminal and that satisfies service of quality required by the second terminal, establishing a radio bearer that satisfies the service of quality required by the second terminal, and allocating the radio bearer to the second terminal.

Three manners of configuring the first radio bearer for the second terminal are described in the three implementations of step S202. However, regardless of which configuration manner is used, once the first radio bearer has been configured for the second terminal, in a subsequent data transmission process, with respect to uplink data, the method may include the following steps:

S21: The first eNB receives, over the first S1 bearer, downlink data destined for the second terminal.

S22: The first eNB sends the downlink data to the first terminal over the first radio bearer mapping the first S1 bearer.

With respect to downlink data, the method may include the following steps:

S23: The first eNB receives uplink data from the first terminal over the first radio bearer.

S24: The first eNB transmits the uplink data over the first S1 bearer mapping the first radio bearer.

Figure 9:
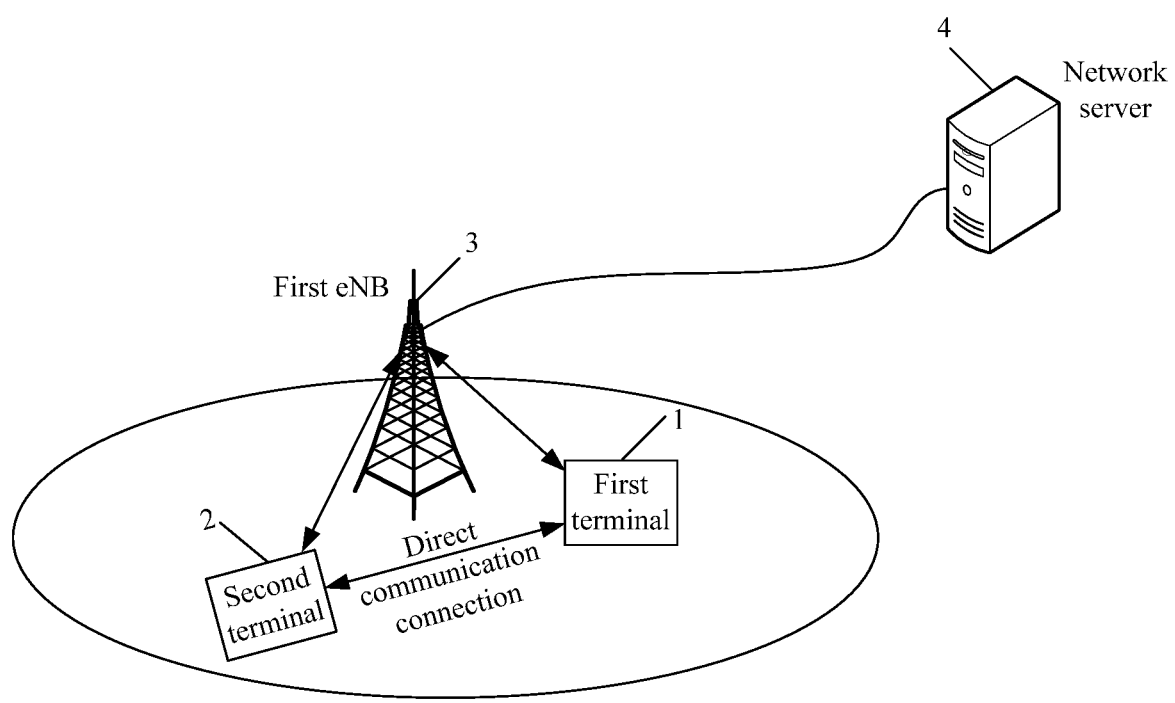
FIG. 9 is a schematic diagram of another network architecture to which a connection control method can be applied according to an embodiment of the present invention.

In the embodiment shown in FIG. 5, description is provided by using a scenario in which the first terminal is located within the coverage area of the first eNB, and the second terminal moves out from the coverage area of the first eNB. Referring to FIG. 9, in another embodiment of the present invention, the first terminal is located within the coverage area of the first eNB, the second terminal is also located within the coverage area of the first eNB, and the second terminal accesses the first eNB by using a second radio bearer.

Therefore, based on the embodiment shown in FIG. 5, the method may further include the following steps:

maintaining the second radio bearer, where there is a mapping relationship between the second radio bearer and the first S1 bearer.

When the second radio bearer is maintained, for the second terminal, on one hand, the second terminal may perform data transmission with the first eNB by directly using the second radio bearer. On the other hand, the second terminal may also perform D2D communication with the first terminal, and then perform data transmission with the first eNB by using the first radio bearer between the first terminal and the first eNB.

Figure 10:
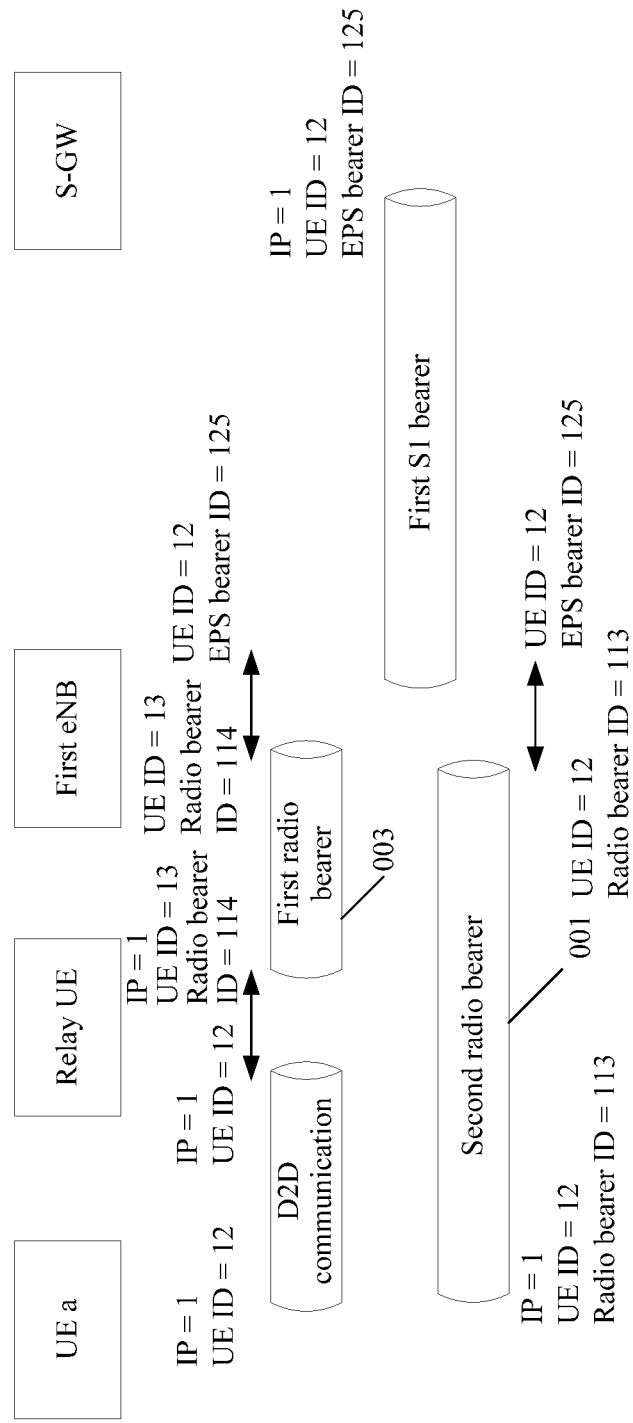
FIG. 10 is a schematic diagram of yet another bearer mapping method according to an embodiment of the present invention.

As shown in FIG. 10, it can be seen from FIG. 10 that UE a may simultaneously have a second radio bearer and a first radio bearer, and may access a first eNB by simultaneously using the second radio bearer and the first radio bearer.

Therefore, in an embodiment of the present invention, with respect to downlink data, the method may further include the following steps:

S31: The first eNB receives, over a first S1 bearer, downlink data destined for a second terminal.

S32: The first eNB sends the downlink data to the second terminal over the second radio bearer mapping the first S1 bearer.

In another embodiment of the present invention, in step S32, the downlink data destined for the second terminal may be sent over the second radio bearer or the first radio bearer. Alternatively, the downlink data destined for the second terminal may be sent over the second radio bearer and the first radio bearer. For example, downlink data destined for the second terminal is divided into at least two parts, some parts are sent to the second terminal over the second radio bearer, and the remaining part is sent to the second terminal over the first radio bearer by using the first terminal.

In another embodiment of the present invention, with respect to uplink data, the method may further include the following steps:

S33: The first eNB receives, over the second radio bearer, uplink data from a second terminal.

S34: Transmit the uplink data by using a first S1 bearer mapping the first radio bearer and the second radio bearer.

In another embodiment of the present invention, in step S33, the uplink data of the second terminal may be received over the second radio bearer or the first radio bearer. Alternatively, the uplink data of the second terminal may be separately received over the second radio bearer and the first radio bearer. For example, uplink data of the second terminal is divided into at least two parts, some parts are sent over the second radio bearer, and the remaining part is sent over the first radio bearer by using the first terminal.

Figure 11:
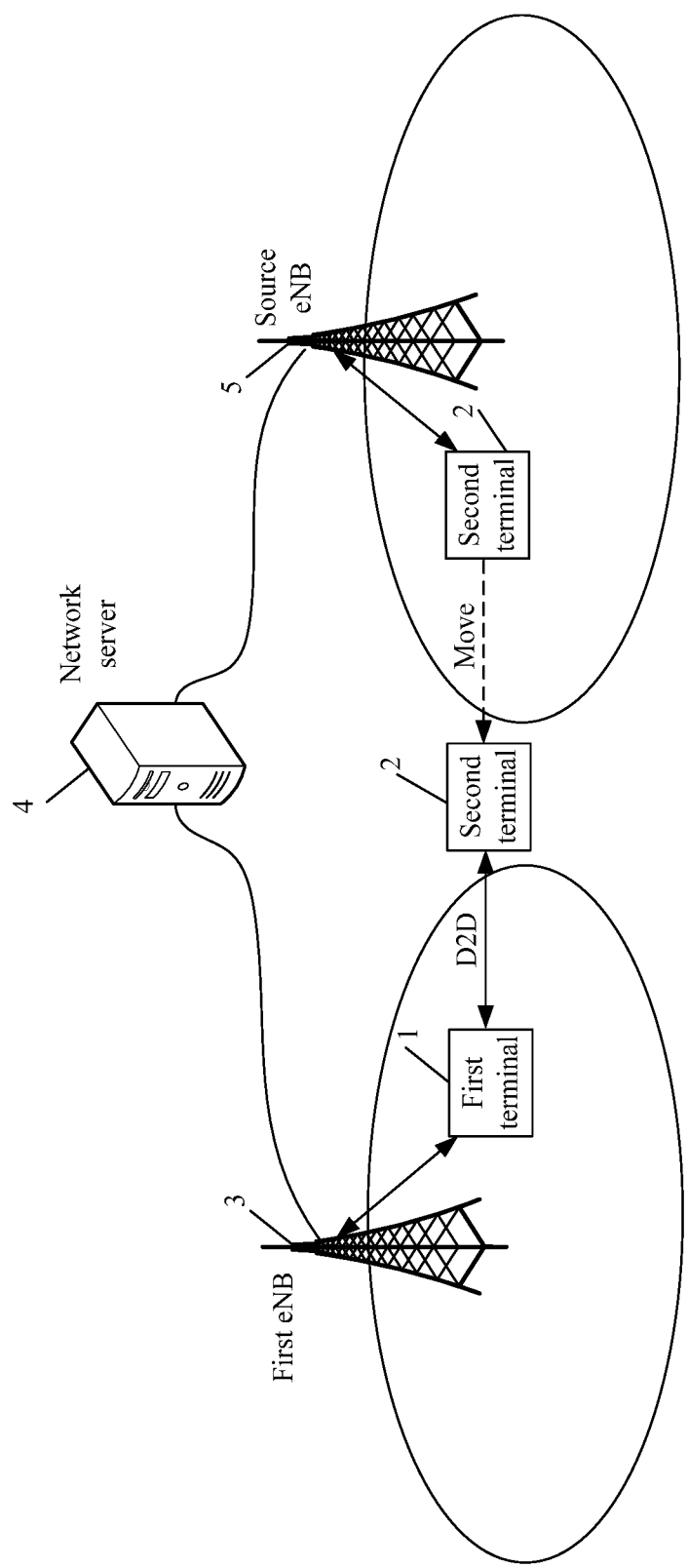
FIG. 11 is a schematic diagram of still another network architecture to which a connection control method can be applied according to an embodiment of the present invention.

Referring to a schematic diagram of a scenario shown in FIG. 11, in another embodiment of the present invention, a first terminal 1 is located within a coverage area of a first eNB 3, a second terminal 2 is originally located within a coverage area of a source eNB 5, and the second terminal 2 moves out from the coverage area of the source eNB 5, and is located outside the coverage area of the first eNB 3. The second terminal 2 and the first terminal 1 may perform D2D communication.

In the scenario shown in FIG. 11, there is an S1 bearer of the source eNB 5 for the second terminal 2, but there is no S1 bearer of the first eNB for the second terminal 2. Therefore, first, a base station that the second terminal 2 accesses needs to be switched from the source eNB 5 to the first eNB 3, and then the second terminal 2 can access a network by using the first terminal 1 and the first eNB 3.

Therefore, in this embodiment of the present invention, context information of the second terminal 2 may further carry an originally-accessed-cell ID of the second terminal 2, that is, an ID of the source eNB 5. After step S201, the method may further include the following steps:

when an ID of the first eNB is the same as the originally-accessed-cell ID, performing step S202; or when an ID of the first eNB is different from the originally-accessed-cell ID, sending a handover request message to the source eNB 5 that is corresponding to the originally-accessed-cell ID; and when a handover acknowledgment message sent by the source eNB 5 is received, performing step S202.

After receiving the handover request, the source eNB 5 may hand over the second terminal 2 between base stations, hand over the second terminal to the first eNB 3, and send the handover acknowledgment message to the first eNB after completing handover. In the art, a process of handing over between base stations is a technology commonly known by a person skilled in the art, and details are not described herein.

After handover between base stations is complete, in one scenario, the second terminal may move into the coverage area of the first eNB anytime. In this case, the first eNB requests an MME to establish a new S1 bearer, and then establishes a new radio bearer for the second terminal. In this way, the second terminal can perform communication with the network by using the first terminal and the first eNB.

In addition, after handover between base stations is complete, in another scenario, the second terminal may return to the coverage area of the source eNB anytime. Therefore, the context information of the second terminal is maintained in the source eNB, and a timer is started. When the timer expires, the context information of the second terminal that is maintained in the source eNB is released. In this way, when moving into the coverage area of the source eNB, the second terminal can quickly access the source eNB.

In addition, after handover between base stations is complete, in still another scenario, a case in which the second terminal moves into the coverage area of the source eNB may not be considered. Therefore, in this embodiment of the present invention, the method may further include the following steps:

after the first radio bearer is configured between the first eNB and the first terminal, sending, by the first eNB, a bearer release request to the source eNB, so that the source eNB releases the context information of the second terminal.

Utilization of the source eNB can be improved by sending the bearer release request.

An MME is used as an example below to describe a connection control method according to an embodiment of the present invention.

In all scenarios shown in FIG. 2, FIG. 9, and FIG. 11, the second terminal may generate a link configuration request message, and send the link configuration request message to the first terminal. The first terminal generates a bearer configuration request message and sends the bearer configuration request message to an MME, so that the MME directly establishes a new EPS bearer, that is, a new radio bearer and S1 bearer between an S-GW and the first terminal, for the second terminal.

Figure 12:
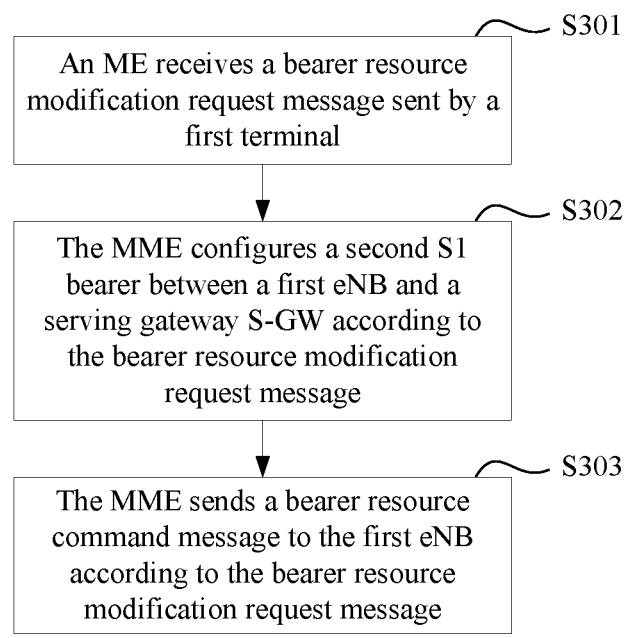
FIG. 12 is a schematic flowchart of still another connection establishment method according to an embodiment of the present invention.

As shown in FIG. 12, the connection control method includes the following steps.

Step S301: An MME receives a bearer resource modification request message sent by a first terminal.

The bearer update request carries context information of a second terminal, and the context information includes at least an identifier of the second terminal.

Step S302: The MME configures a second S1 bearer between a first eNB and a serving gateway S-GW according to the bearer resource modification request message.

The second S1 bearer is used to transmit service data of the second terminal, and an identifier of the second S1 bearer may be corresponding to the ID of the second terminal.

Step S303: The MME sends a bearer resource command message to the first eNB according to the bearer resource modification request message.

According to this step, the first eNB can configure a first radio bearer between the first eNB and the first terminal for the second terminal.

Figure 13:
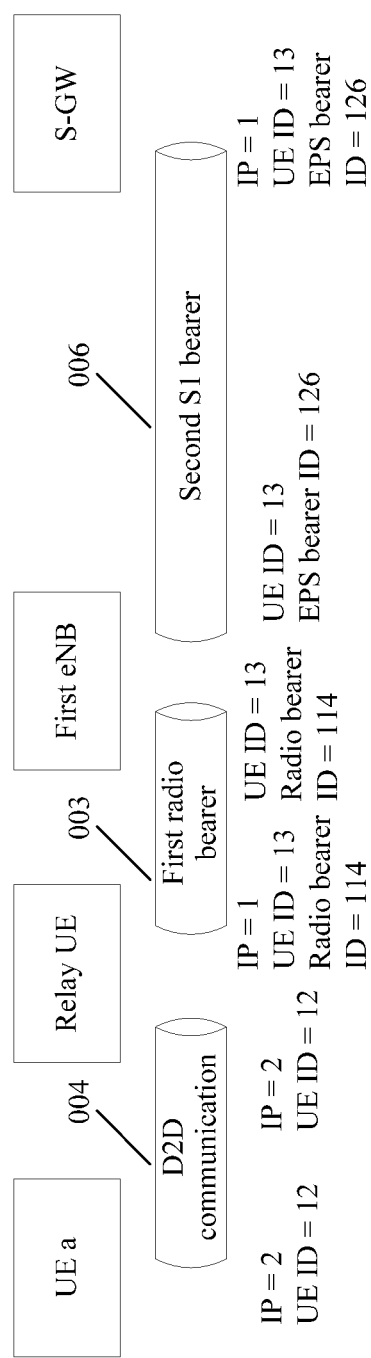
FIG. 13 is a schematic diagram of yet another bearer mapping method according to an embodiment of the present invention.

Referring to FIG. 13, in the figure, there is a second S1 bearer 006 and a first radio bearer 003. According to this method embodiment, UE a may perform data transmission with a network over the first radio bearer and the second S1 bearer by using relay UE and the first eNB.

Compared with the embodiment shown in FIG. 5, in the method provided in this embodiment of the present invention, the relay UE establishes a brand-new independent bearer between the first terminal and the gateway. In addition, a P-GW performs processing in a data mapping process, that is, in an entire data transmission process of the second terminal, mapping between the P-GW and the relay UE is performed; while in the embodiment shown in FIG. 5, a data mapping process between the first eNB and the relay UE is performed.

In this embodiment of the present invention, step S302 may include the following steps:

S3021: The MME allocates an identifier ID of the second S1 bearer to the second terminal.

The bearer resource command carries an identifier of a second EPS bearer allocated to the second terminal. The identifier of the second EPS bearer may be used to identify the second S1 bearer.

S3022: The MME sends a bearer resource command message to the S-GW, where the bearer resource command message carries the identifier ID of the second S1 bearer.

S3023: The MME receives a bearer creation request message sent by the S-GW.

S3024: The MME sends a bearer setting E-RAB modification request message to the first eNB according to the bearer creation request message.

S3025: The MME receives an E-RAB bearer setting modification response message that is sent by the first eNB according to the E-RAB (Evolution Radio Access Bearer, E-UTRAN radio access bearer) modification request message.

S3026: The MME sends a bearer creation response message to the S-GW according to the E-RAB bearer setting modification response message, so as to establish the second S1 bearer between the S-GW and the first eNB.

According to the foregoing step, the second S1 bearer, that is, an EPS bearer, can be established between the S-GW and the first eNB. In this embodiment of the present invention, a process of establishing the S1 bearer, that is, an EPS bearer, is commonly known by a person skilled in the art, and details are not described herein.

The method provided in this embodiment of the present invention is described below by using a specific embodiment.

Figure 14:
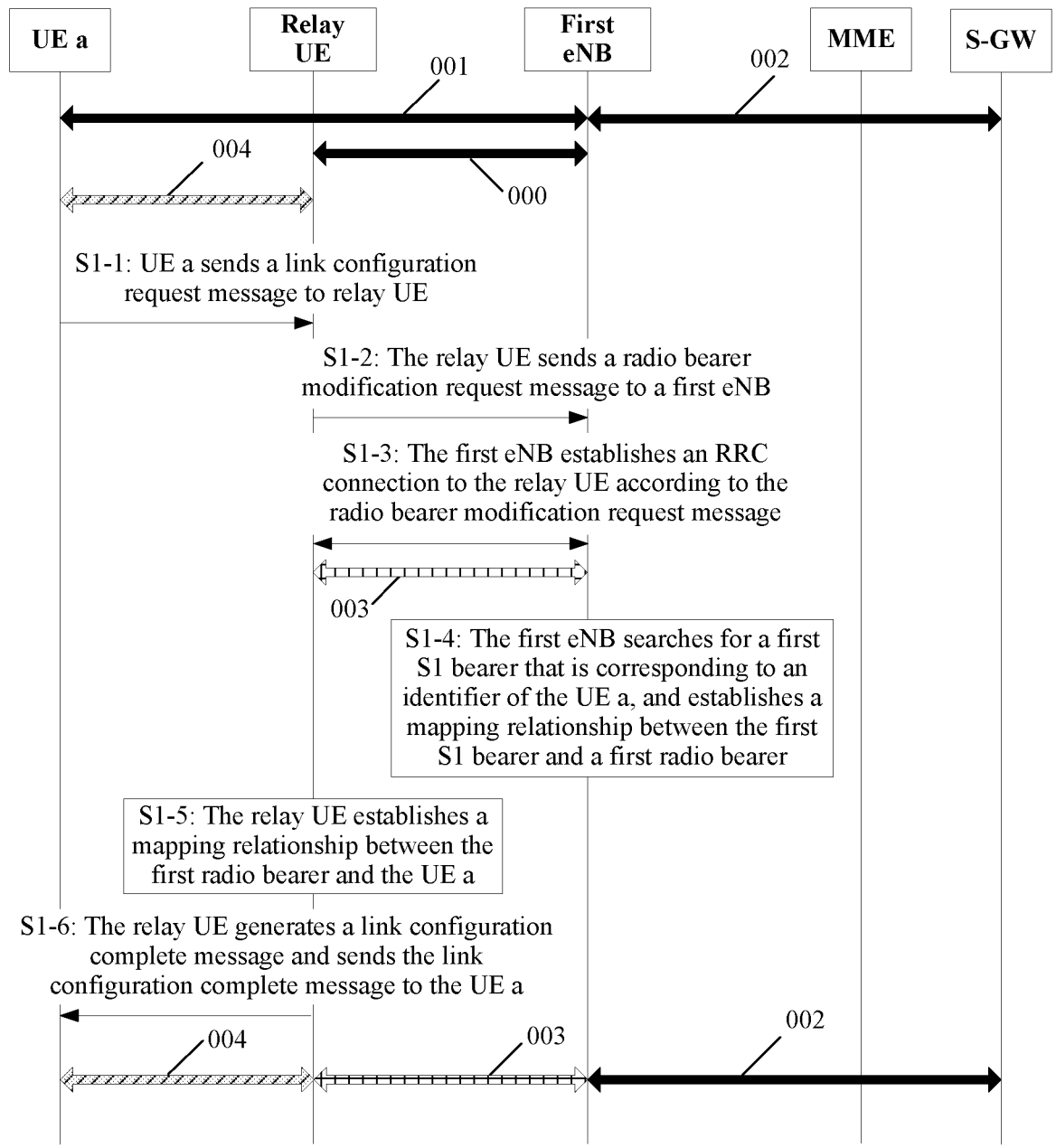
FIG. 14 is a signaling flowchart according to an embodiment of the present invention.

(1) FIG. 14 is a signaling flowchart according to an embodiment of the present invention.

In this embodiment of the present invention, as shown in FIG. 14, in the figure, a first terminal is relay UE, and a second terminal is UE a. In addition, the relay UE is located within a coverage area of a first eNB, and the UE a moves out from the coverage area of the first eNB. A radio bearer 000 is configured between the relay UE and the first eNB. When the UE a is located within the coverage area of the first eNB, a second radio bearer 001 is configured between the UE a and the first eNB, and a first S1 bearer 002 used to transmit data of the UE a is configured between the first eNB and an S-GW. When the UE a moves out from the coverage area of the first eNB, the UE a and the relay UE may perform D2D communication. The method may include the following steps:

S1-1: The UE a sends a link configuration request message to the relay UE.

S1-2: The relay UE sends a radio bearer modification request message to the first eNB.

The radio bearer modification request message is sent to the first eNB, so that the first eNB configures a first radio bearer between the first eNB and the relay UE for the UE a. The bearer update request carries an identifier of the UE a.

S1-3: The first eNB establishes an RRC connection to the relay UE according to the radio bearer modification request message.

The established RRC connection may be the first radio bearer that is configured between the first eNB and the relay UE for the UE a. A first radio bearer 003 is shown in FIG. 14.

S1-4: The first eNB searches for a first S1 bearer that is corresponding to an identifier of the UE a, and establishes a mapping relationship between the first S1 bearer and a first radio bearer.

The UE a moves out from the coverage area of the first eNB. Therefore, there is a corresponding historical first S1 bearer, used by the UE a to access a network, of the first eNB. The first S1 bearer of the first eNB can be found by using the identifier of the UE a.

S1-5: The relay UE establishes a mapping relationship between the first radio bearer and the UE a.

S1-6: The relay UE generates a link configuration complete message and sends the link configuration complete message to the UE a.

According to the embodiment shown in FIG. 14, it can be learned that, after the UE a receives the link configuration complete message, the UE a may perform data transmission with the network over the first radio bearer 003 and the first S1 bearer 002 by using the relay UE and the first eNB, so that the UE a may access the network by using the relay UE.

Figure 15:
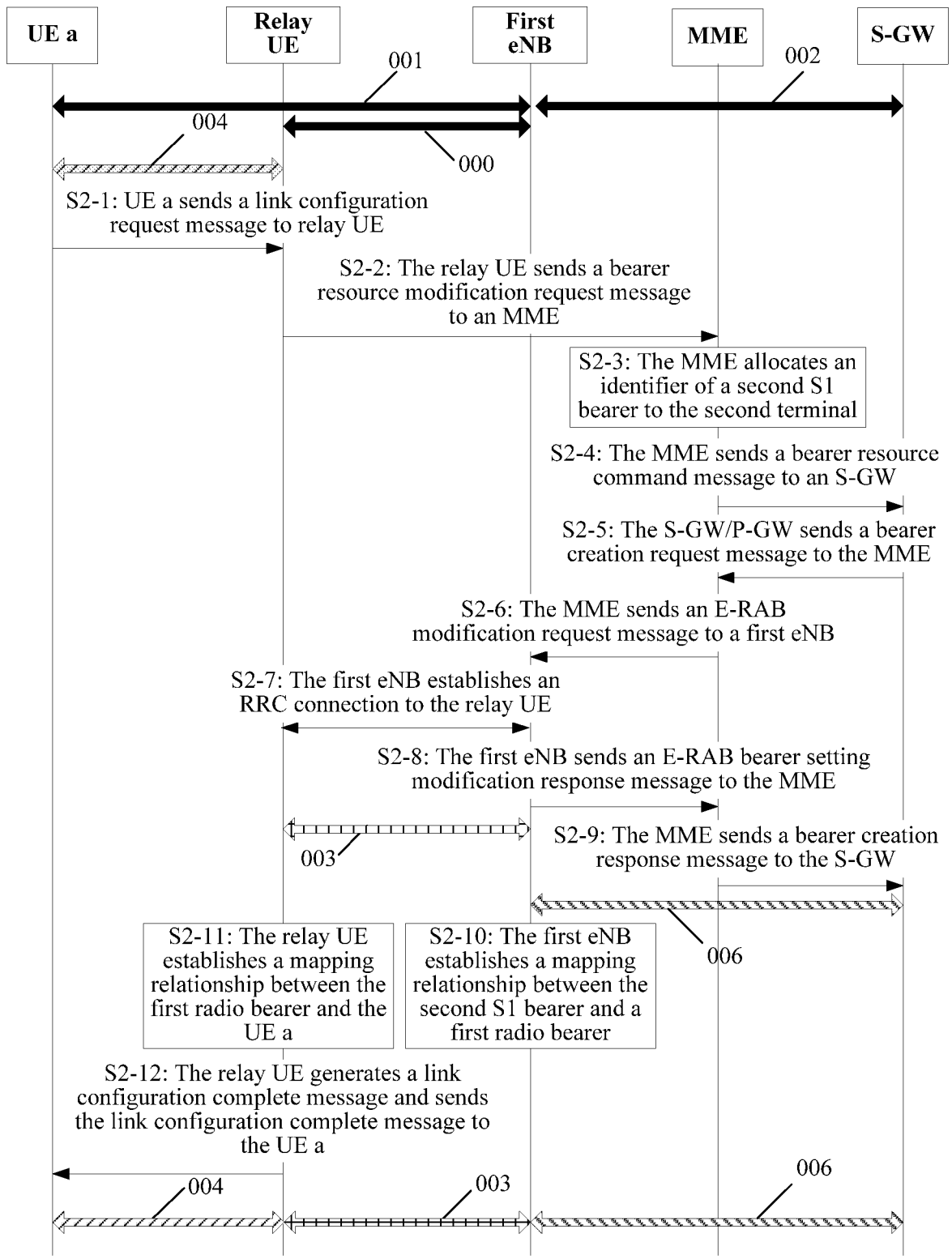
FIG. 15 is another signaling flowchart according to an embodiment of the present invention.

(2) FIG. 15 is a signaling flowchart according to another embodiment of the present invention.

In this embodiment of the present invention, as shown in FIG. 15, in the figure, a first terminal is relay UE, and a second terminal is UE a. In addition, the relay UE is located within a coverage area of a first eNB, and the UE a moves out from the coverage area of the first eNB. A radio bearer 000 used to transmit relay service data is configured between the relay UE and the first eNB. When the UE a is located within the coverage area of the first eNB, a second radio bearer 001 is configured between the relay UE and the first eNB, and a first S1 bearer 002 used to transmit data of the UE a is configured between the first eNB and an S-GW. When the UE a moves out from the coverage area of the first eNB, the relay UE and the UE a may perform D2D communication. The method may include the following steps:

S2-1: The UE a sends a link configuration request message to the relay UE.

S2-2: The relay UE sends a bearer resource modification request message to an MME.

The bearer resource modification request message is sent to the MME, so that when receiving the bearer resource modification request message, the MME may control the relay UE to configure a service bearer for the UE a.

S2-3: The MME allocates an identifier of a second S1 bearer to the second terminal.

S2-4: The MME sends a bearer resource command message to the S-GW.

The bearer resource command message carries the ID of the second S1 bearer.

S2-5: The S-GW/P-GW sends a bearer creation request message to the MME.

S2-6: The MME sends an E-RAB modification request message to the first eNB.

S2-7: The first eNB establishes an RRC connection to the relay UE.

The established RRC connection may be a first radio bearer that is configured between the first eNB and the relay UE for the UE a. A first radio bearer 003 is shown in FIG. 15.

S2-8: The first eNB sends an E-RAB modification response message to the MME.

S2-9: The MME sends a bearer creation response message to the S-GW.

After receiving the bearer creation response, the S-GW may establish the second S1 bearer between the first eNB and the S-GW for the UE a. A second S1 bearer 006 is shown in FIG. 15.

S2-10: The first eNB establishes a mapping relationship between the second S1 bearer and a first radio bearer.

S2-11: The relay UE establishes a mapping relationship between the first radio bearer and the UE a.

S2-12: The relay UE generates a link configuration complete message and sends the link configuration complete message to the UE a.

According to the embodiment shown in FIG. 15, it can be learned that, after the UE a receives the link configuration complete message, the UE a may perform data transmission with a network over the first radio bearer 003 and the second S1 bearer 006 by using the relay UE and the first eNB, so that the UE a may access the network by using the relay UE.

Figure 16:
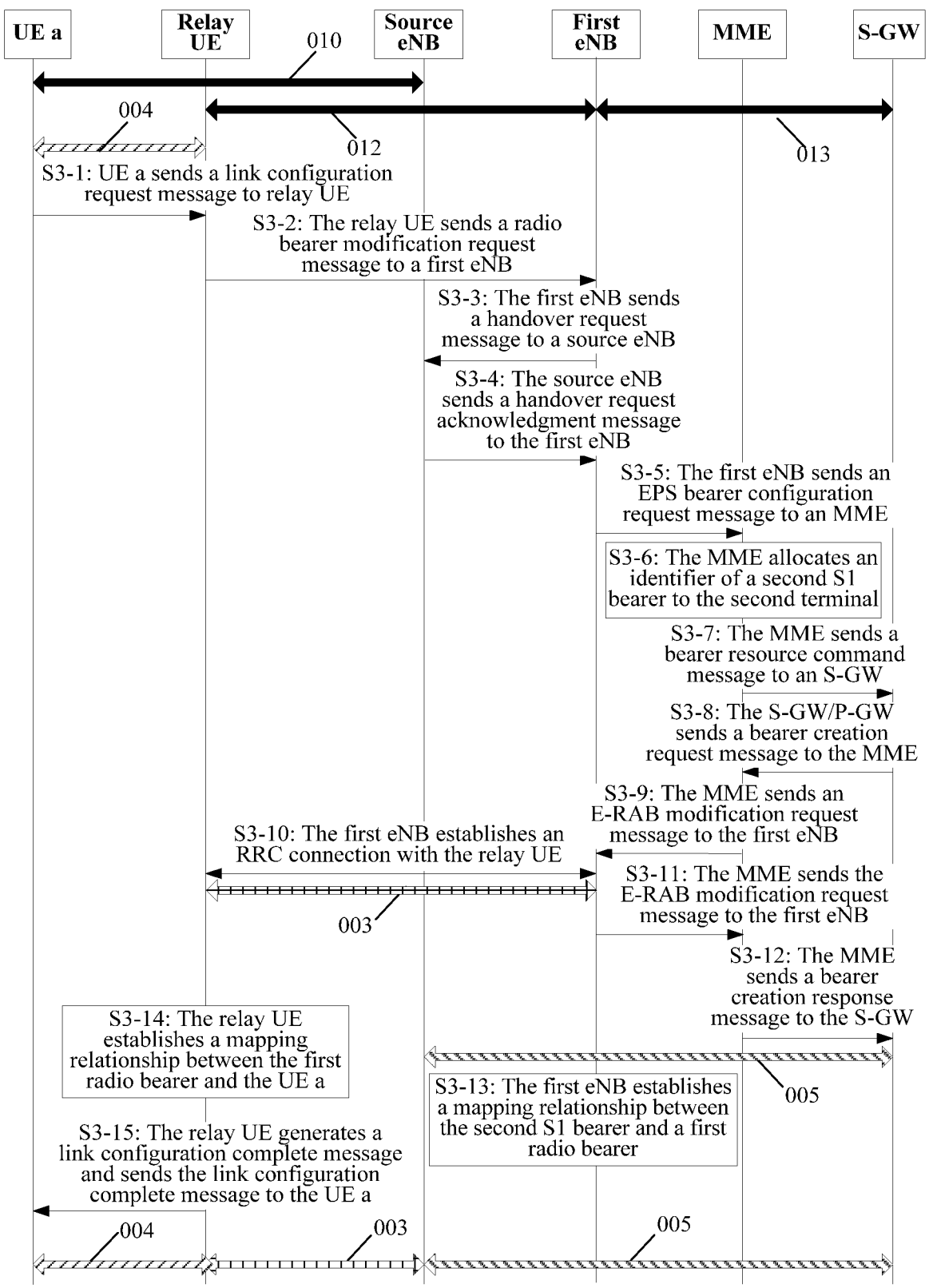
FIG. 16 is still another signaling flowchart according to an embodiment of the present invention.

(3) FIG. 16 is a signaling flowchart according to another embodiment of the present invention.

In this embodiment of the present invention, as shown in FIG. 16, in the figure, a first terminal is relay UE, and a second terminal is UE a. In addition, the relay UE is located within a coverage area of a first eNB, and the UE a is located within a coverage area of a source eNB and is located outside the coverage area of the first eNB. A radio bearer 010 is configured between the UE a and the source eNB, a radio bearer 012 is configured between the relay UE and the first eNB, and an S1 bearer 013 used to transmit service data of the first terminal is configured between the first eNB and an S-GW. The UE a and the relay UE may perform D2D communication. The method may include the following steps:

S3-1: The UE a sends a link configuration request message to the relay UE.

S3-2: The relay UE sends a radio bearer modification request message to the first eNB.

The radio bearer modification request message is sent to the first eNB, so that the first eNB configures a first radio bearer between the first eNB and the relay UE for the UE a. The radio bearer modification request message carries an identifier of the UE a. The radio bearer modification request message further carries an originally-accessed-cell ID of the UE a, that is, an ID of a cell served by the source eNB.

S3-3: The first eNB sends a handover request message to the source eNB.

A base station that the UE a accesses may be switched from the source eNB to the first eNB by sending the handover request.

S3-4: The source eNB sends a handover request acknowledgment message to the first eNB.

S3-5: The first eNB sends an EPS bearer configuration request message to an MME.

After the first eNB receives the handover request acknowledgment message, it indicates that a service bearer may be established for the UE a to access a network. However, because the UE a has not accessed the first eNB before, there is no S1 bearer of the first eNB for the UE a. Therefore, the first eNB needs to send the EPS bearer configuration request message to the MME, so that the MME configures a new S1 bearer between the first eNB and the S-GW for the UE a.

S3-6: The MME allocates an identifier of a second S1 bearer to the second terminal, where the identifier of the second S1 bearer may be represented by an identifier of EPS that is allocated by the MME to the second terminal S3-7: The MME sends a bearer resource command message to the S-GW.

The bearer resource command message carries the ID of the second S1 bearer.

S3-8: The S-GW/P-GW sends a bearer creation request message to the MME.

S3-9: The MME sends an E-RAB modification request message to the first eNB.

S3-10: The first eNB establishes an RRC connection to the relay UE.

The established RRC connection may be a first radio bearer that is configured between the first eNB and the relay UE for the UE a. A first radio bearer 003 is shown in FIG. 16.

S3-11: The first eNB sends an E-RAB modification response message to the MME.

S3-12: The MME sends a bearer creation response message to the S-GW.

After receiving the bearer creation response message, the S-GW may establish the second S1 bearer between the first eNB and the S-GW/P-GW for the UE a. A second S1 bearer 005 is shown in FIG. 16.

S3-13: The first eNB establishes a mapping relationship between the second S1 bearer and a first radio bearer.

S3-14: The relay UE establishes a mapping relationship between the first radio bearer and the UE a.

S3-15: The relay UE generates a link configuration complete message and sends the link configuration complete message to the UE a.

According to the embodiment shown in FIG. 16, it can be learned that, when the UE a that originally accesses the source eNB performs direct communication with the relay UE, the UE a may send the link configuration request message to the relay UE, so that the relay UE sends the radio bearer modification request message to the first eNB. After the first eNB receives the radio bearer modification request message, base station switching is performed between the first eNB and the source eNB, and the first eNB initiates the EPS bearer configuration request to the MME, so as to establish the second S1 bearer between the first eNB and the S-GW/P-GW for the UE a, and the first eNB further establishes the first radio bearer between the first eNB and the relay UE for the UE a. In this way, after the UE a receives the link configuration complete message, the UE a may perform data transmission with a network over the first radio bearer 003 and the second S1 bearer 005 by using the relay UE and the first eNB, so that the UE a may access the network by using the relay UE.

It can be learned from the description of the foregoing method embodiments that, a person skilled in the art can clearly understand that the present invention may be implemented by means of software plus a necessary universal hardware platform, and certainly, may be implemented by means of hardware. However, the former implementation is preferable in most cases. Based on such an understanding, the essence, or a part that contributes to the prior art, of the technical solutions of the present invention may be embodied in a form of a software product. The computer software product may be stored in a storage medium, and includes several instructions for instructing a computer device (which may be a personal computer, a server, a network device, or the like) to perform all or some of the steps of the methods described in the embodiments of the present invention. The storage medium is a medium, such as a read-only memory (ROM), a random access memory (RAM), a magnetic disk, or an optic disc, that can store program code.

Figure 17:
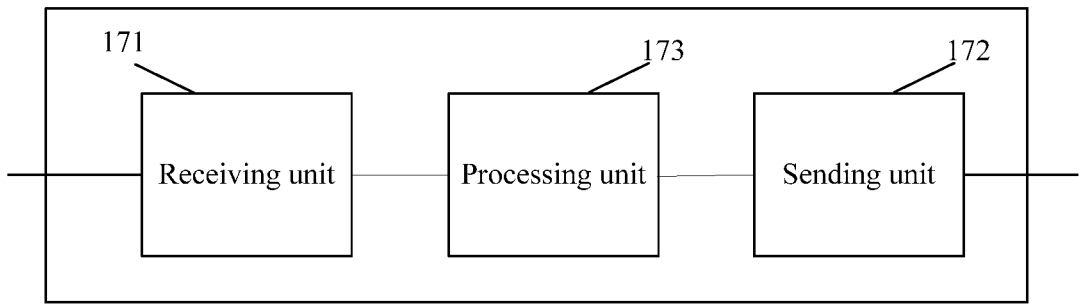
FIG. 17 is a schematic structural diagram of a connection control apparatus according to an embodiment of the present invention.

Corresponding to the embodiment of the connection control method provided in FIG. 3 of the present invention, a connection control apparatus that is applied to an eNB is further provided in the present invention. As shown in FIG. 17, the connection control apparatus may include a receiving unit 171, a sending unit 172, and a processing unit 173.

The receiving unit 171 is configured to receive a link configuration request message sent by a second terminal. The link configuration request message carries context information of the second terminal, and the context information includes at least an identifier ID of the second terminal.

The sending unit 172 is configured to send a bearer configuration request message to a network-side device according to the link configuration request message. The bearer configuration request message includes a radio bearer modification request message or a bearer resource modification request message. The bearer configuration request message carries the context information, and the bearer configuration request message is used to request the network-side device to configure a service bearer. The service bearer is used to transmit service data of the second terminal.

The receiving unit 171 is further configured to receive a bearer configuration complete message that is sent by the network-side device according to the bearer configuration request message. The bearer configuration complete message carries an ID of the service bearer.

The processing unit 173 is configured to establish a mapping relationship between the service bearer and the second terminal.

The sending unit 172 is further configured to send a link configuration complete message to the second terminal after the mapping relationship is established, so that the second terminal performs data transmission with the network-side device over the service bearer by using a first terminal.

In an embodiment of the present invention, the sending, by the sending unit 172 shown in FIG. 17, a bearer configuration request message to a network-side device according to the link configuration request message includes:

sending, according to the context information, a radio bearer modification request message to a first base station eNB that serves the first terminal, so that the first eNB configures a first radio bearer between the first eNB and the first terminal, where the first radio bearer is used to transmit the service data of the second terminal.

In another embodiment of the present invention, the sending, by the sending unit 172 shown in FIG. 17, a bearer configuration request message to a network-side device according to the link configuration request message includes:

sending a bearer resource modification request message to a mobility management entity MME according to the context information, so that the MME configures a second S1 bearer between a first eNB and a serving gateway S-GW, and the MME controls the first eNB to configure a first radio bearer between the first eNB and the first terminal, where the second S1 bearer and the first radio bearer are used to transmit the service data of the second terminal.

In another embodiment of the present invention, the establishing, by the processing unit 173 shown in FIG. 17, a mapping relationship between the service bearer and the second terminal includes:

establishing a mapping relationship between an ID of the first radio bearer and the ID of the second terminal; establishing a mapping relationship between an ID of the first radio bearer and a first IP address, where the context information further includes the first IP address allocated by a data gateway P-GW to the second terminal; or allocating a second IP address to the second terminal, establishing a mapping relationship between the first IP address and the second IP address, and establishing a mapping relationship between an ID of the first radio bearer and the second IP address, where the context information further includes the first IP address allocated by a data gateway P-GW to the second terminal.

In another embodiment of the present invention, in an uplink direction, the receiving unit 171 is further configured to receive uplink data whose source IP address is a second IP address and that is sent by the second terminal, and the source IP address of the uplink data is the second IP address. The processing unit 172 is further configured to replace the source IP address of the uplink data with the first IP address. The sending unit 173 is further configured to send, to the first eNB over a first radio bearer mapping the second IP address, the uplink data whose source IP address is replaced.

In a downlink direction, the receiving unit 171 is further configured to receive, over the first radio bearer mapping the second IP address, downlink data that is destined for the second terminal and whose destination IP address is the first IP address, where the destination IP address of the downlink data is the first IP address. The processing unit 173 is further configured to replace the destination IP address of the downlink data with the second IP address. The sending unit 172 is further configured to send, to the second terminal, the downlink data whose destination IP address is replaced.

In another embodiment of the present invention, the context information of the second terminal further includes an originally-accessed-cell ID of the second terminal. The receiving unit 171 is further configured to receive the originally-accessed-cell ID of the second terminal in the context information. The sending unit 172 is further configured to send the originally-accessed-cell ID of the second terminal to the first eNB. In this embodiment, the first eNB can learn of the originally-accessed-cell ID of the second terminal.

Figure 18:
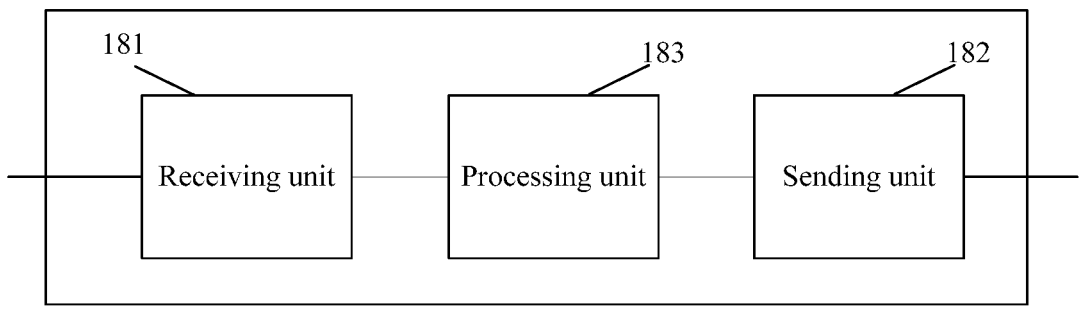
FIG. 18 is a schematic structural diagram of another connection control apparatus according to an embodiment of the present invention.

Corresponding to the embodiment of the connection control method provided in FIG. 5 of the present invention, a connection control apparatus that is applied to a terminal is further provided in the present invention. As shown in FIG. 18, the connection control apparatus may include a receiving unit 181, a sending unit 182, and a processing unit 183.

The receiving unit 181 is configured to receive a radio bearer modification request message sent by a first terminal. The radio bearer modification request message carries context information of a second terminal, and the context information includes at least an identifier of the second terminal.

The processing unit 183 is configured to configure a first radio bearer between a first eNB and the first terminal according to the radio bearer modification request message. The first radio bearer is used to transmit service data of the second terminal.

The processing unit 183 is further configured to search an existing S1 bearer that is of the first eNB and that is between the first eNB and a serving gateway S-GW for a first S1 bearer that is corresponding to the identifier ID of the second terminal.

The processing unit 183 is further configured to establish a mapping relationship between the first radio bearer and the first S1 bearer.

The sending unit 182 is configured to send a bearer configuration complete message to the first terminal after the mapping relationship is established. The bearer configuration complete message carries an ID of the first radio bearer.

In an embodiment of the present invention, the configuring, by the processing unit 183 shown in FIG. 18, a first radio bearer between a first eNB and the first terminal includes:

configuring an existing radio bearer between the first eNB and the first terminal as the first radio bearer, where the existing radio bearer is used to transmit service data of another second terminal; or establishing the first radio bearer between the first eNB and the first terminal.

In an embodiment of the present invention, the context information further includes an originally-accessed-cell ID of the second terminal. The processing unit 183 shown in FIG. 18 is further configured to: when an ID of the first eNB is the same as the originally-accessed-cell ID, configure the first radio bearer between the first eNB and the first terminal according to the radio bearer modification request message.

In an embodiment of the present invention, the sending unit 182 shown in FIG. 18 is further configured to: when an ID of the first eNB is different from the originally-accessed-cell ID, send a handover request message to a source eNB that is corresponding to the originally-accessed-cell ID. The receiving unit 181 is further configured to receive a handover acknowledgment message sent by the source eNB. The processing unit 183 is further configured to: when the handover acknowledgment message sent by the source eNB is received, configure the first radio bearer between the first eNB and the first terminal according to the radio bearer modification request message.

In an embodiment of the present invention, in an uplink direction, the receiving unit 181 shown in FIG. 18 is further configured to receive, over the first S1 bearer, downlink data destined for the second terminal. The sending unit 182 is further configured to send the downlink data to the first terminal over the first radio bearer mapping the first S1 bearer, so that the first terminal forwards the downlink data to the second terminal.

In an embodiment of the present invention, in a downlink direction, the receiving unit 181 shown in FIG. 18 is further configured to receive uplink data of the second terminal over the first radio bearer. The sending unit 182 is further configured to transmit the uplink data over the first S1 bearer mapping the first radio bearer.

Figure 19:
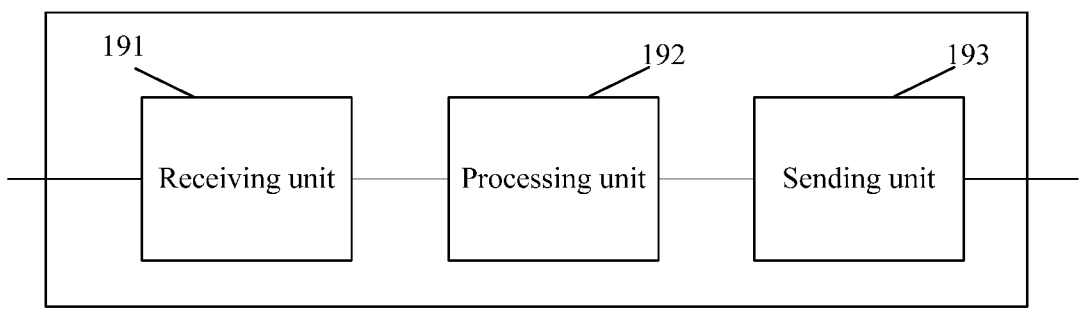
FIG. 19 is a schematic structural diagram of still another connection control apparatus according to an embodiment of the present invention.

Corresponding to the embodiment of the connection control method provided in FIG. 12 of the present invention, a connection control apparatus that is applied to an MME is further provided in the present invention. As shown in FIG. 19, the connection control apparatus may include a receiving unit 191, a sending unit 192, and a processing unit 193.

The receiving unit 191 is configured to receive a bearer resource modification request message sent by a first terminal. The bearer resource modification request message carries context information of a second terminal, and the context information includes at least an identifier ID of the second terminal.

The processing unit 192 is configured to configure a second S1 bearer between a first eNB and a serving gateway S-GW according to the bearer resource modification request message. The second S1 bearer is used to transmit service data of the second terminal.

The sending unit 193 is configured to send a radio resource control RRC reconfiguration message to the first eNB according to the bearer resource modification request message, so that the first eNB configures a first radio bearer between the first eNB and the first terminal. The first radio bearer is used to transmit the service data of the second terminal.

In an embodiment of the present invention, the processing unit 193 is further configured to allocate an identifier of the second S1 bearer to the second terminal.

The sending unit 192 is further configured to send a bearer resource command message to the S-GW. The bearer resource command message carries the identifier of the second S1 bearer.

The receiving unit 191 is further configured to receive a bearer creation request message sent by the S-GW.

The sending unit 192 is further configured to send a bearer setting request message to the first eNB according to the bearer creation request message.

The receiving unit 191 is further configured to receive a bearer setting response message that is sent by the first eNB according to the bearer setting request message.

The sending unit 192 is further configured to send a bearer creation response message to the S-GW according to the bearer setting response message, so as to establish the second S1 bearer between the S-GW and the first eNB.

Figure 20:
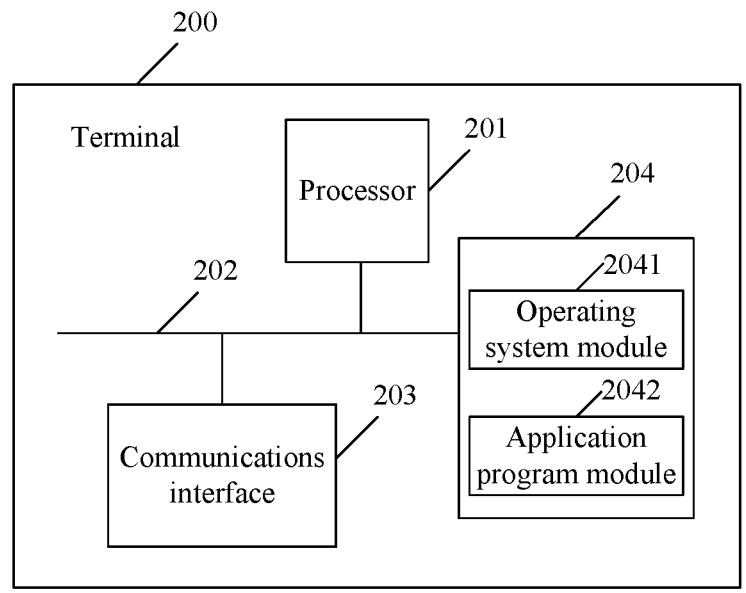
FIG. 20 is a schematic structural diagram of a terminal according to an embodiment of the present invention.

An embodiment of the present invention further provides a terminal. As shown in FIG. 20, the terminal 200 may include at least one processor 201, at least one communications bus 202, at least one communications interface 203, and at least one memory 204.

The communications bus 202 is configured to implement connection and communication between these components. The memory 204 may include a read-only memory and a random access memory, and provides an instruction and data to the processor 201. A part of the memory 204 may further include a non-volatile random access memory (NVRAM).

In some implementations, the memory 204 stores the following elements: an executable module or a data structure, or a subset thereof, or an extended set thereof. In this embodiment, the memory 204 includes an operating system module 2041 and an application program module 2042.

The operating system module 2041 includes various system programs, and is configured to implement various basic services and process a hardware-based task.

The application program module 2042 includes various application programs, such as a launcher (launcher), a media player (Media Player), and a browser (Browser), and is configured to implement various application services.

In this embodiment of the present invention, by invoking a program or an instruction stored by the memory 604, the processor 601 is configured to:

receive a link configuration request message sent by a second terminal, where the link configuration request message carries context information of the second terminal, and the context information includes at least an identifier ID of the second terminal;

send a bearer configuration request message to a network-side device according to the link configuration request message, where the bearer configuration request message includes at least a radio bearer modification request message or a bearer resource modification request message, the bearer configuration request message carries the context information, the bearer configuration request message is used to request the network-side device to configure a service bearer, and the service bearer is used to transmit service data of the second terminal;

receive a bearer configuration complete message that is sent by the network-side device, where the bearer configuration complete message carries an ID of the service bearer;

establish a mapping relationship between the service bearer and the second terminal; and send a link configuration complete message to the second terminal after establishing the mapping relationship, so that the second terminal performs data transmission with the network-side device over the service bearer by using a first terminal.

Optionally, when sending the bearer configuration request message to the network-side device according to the link configuration request message, the processor is specifically configured to:

send, according to the context information, a radio bearer modification request message to a first base station eNB that serves the first terminal, so that the first eNB configures a first radio bearer between the first eNB and the first terminal, where the first radio bearer is used to transmit the service data of the second terminal.

Optionally, when sending the bearer configuration request message to the network-side device according to the link configuration request message, the processor is specifically configured to:

send a bearer resource modification request message to a mobility management entity MME according to the context information, so that the MME configures a second S1 bearer between a first eNB and a serving gateway S-GW, and the MME controls the first eNB to configure a first radio bearer between the first eNB and the first terminal, where the second S1 bearer and the first radio bearer are used to transmit the service data of the second terminal.

Optionally, when establishing the mapping relationship between the service bearer and the second terminal, the processor is specifically configured to:

establish a mapping relationship between an ID of the first radio bearer and the ID of the second terminal; establish a mapping relationship between an ID of the first radio bearer and the ID of the second terminal; or allocate a second IP address to the second terminal, establish a mapping relationship between the first IP address and the second IP address, and establish a mapping relationship between an ID of the first radio bearer and the second IP address, where the context information further includes the first IP address allocated by a P-GW to the second terminal.

Optionally, the processor is further configured to:

in an uplink direction, receive uplink data of the second terminal, where a source IP address of the uplink data is the second IP address; replace the source IP address of the uplink data with the first IP address; and send, to the first eNB over the first radio bearer mapping the second IP address, the uplink data whose IP address is replaced; and/or in a downlink direction, receive, over the first radio bearer mapping the second IP address, downlink data that is destined for the second terminal and whose destination IP address is the first IP address, where the destination IP address of the downlink data is the first IP address; replace the destination IP address of the downlink data with the second IP address; and send, to the second terminal, the downlink data whose IP address is replaced.

Figure 21:
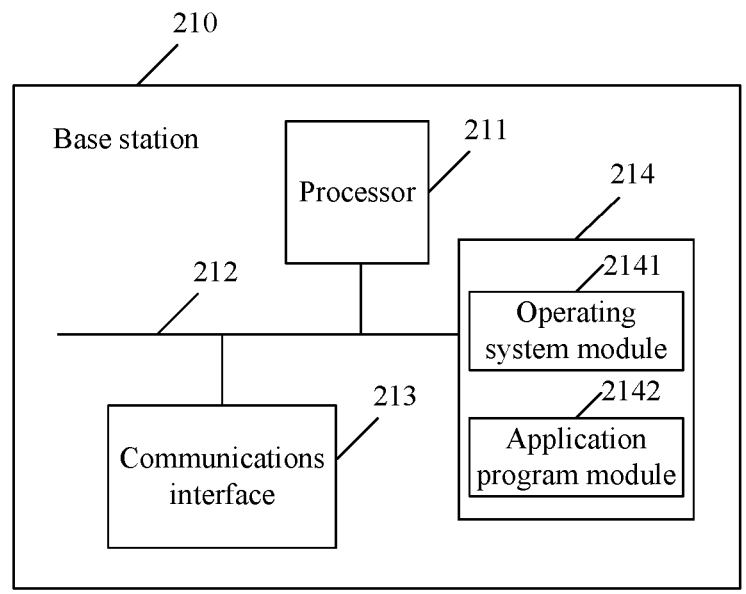
FIG. 21 is a schematic structural diagram of an eNB according to an embodiment of the present invention.

An embodiment of the present invention further provides a base station. As shown in FIG. 21, the base station 210 includes at least one processor 211, at least one bus 212, at least one communications interface 213, and at least one memory 214.

The memory 211 is configured to store a computer executable instruction.

The processor 211 is connected to the communications interface 213 and the memory 214 by using the bus 212.

When a computer is run, the processor 211 executes the computer executable instruction stored in the memory 214, and the processor 211 is configured to:

receive a radio bearer modification request message sent by a first terminal, where the radio bearer modification request message carries context information of a second terminal, and the context information includes at least an identifier ID of the second terminal;

configure a first radio bearer between a first eNB and the first terminal according to the radio bearer modification request message, where the first radio bearer is used to transmit service data of the second terminal;

search an existing S1 bearer of the first eNB for a first S1 bearer that is corresponding to the ID of the second terminal;

establish a mapping relationship between the first radio bearer and the first S1 bearer; and send a bearer configuration complete message to the first terminal after establishing the mapping relationship, where the bearer configuration complete message carries an ID of the first radio bearer.

Optionally, when configuring the first radio bearer between the first eNB and the first terminal, the processor is specifically configured to:

configure an existing radio bearer between the first eNB and the first terminal as the first radio bearer, where the existing radio bearer is used to transmit service data of another second terminal; or establish the first radio bearer between the first eNB and the first terminal.

Optionally, the processor is specifically further configured to:

when an ID of the first eNB is the same as an originally-accessed-cell ID, configure the first radio bearer between the first eNB and the first terminal according to the radio bearer modification request message; or when an ID of the first eNB is different from an originally-accessed-cell ID, send a handover request message to a source eNB that is corresponding to the originally-accessed-cell ID, and when receiving a handover acknowledgment message sent by the source eNB, configure the first radio bearer between the first eNB and the first terminal according to the radio bearer modification request message.

Optionally, the processor is specifically further configured to:

in a downlink direction, receive, over the first S1 bearer, downlink data destined for the second terminal; and send the downlink data to the first terminal over the first radio bearer mapping the first S1 bearer; and/or in an uplink direction, receive uplink data from the first terminal over the first radio bearer; and transmit the uplink data over the first S1 bearer mapping the first radio bearer.

Optionally, the processor is specifically further configured to:

when there is a second radio bearer, mapping the first S1 bearer, between the second terminal and the first eNB, in a downlink direction, configured to receive, over the first S1 bearer, downlink data destined for the second terminal; and send the downlink data to the second terminal over the second radio bearer mapping the first S1 bearer; and/or in an uplink direction, receive uplink data of the second terminal over the second radio bearer; and transmit the uplink data over the first S1 bearer mapping the second radio bearer.

Figure 22:
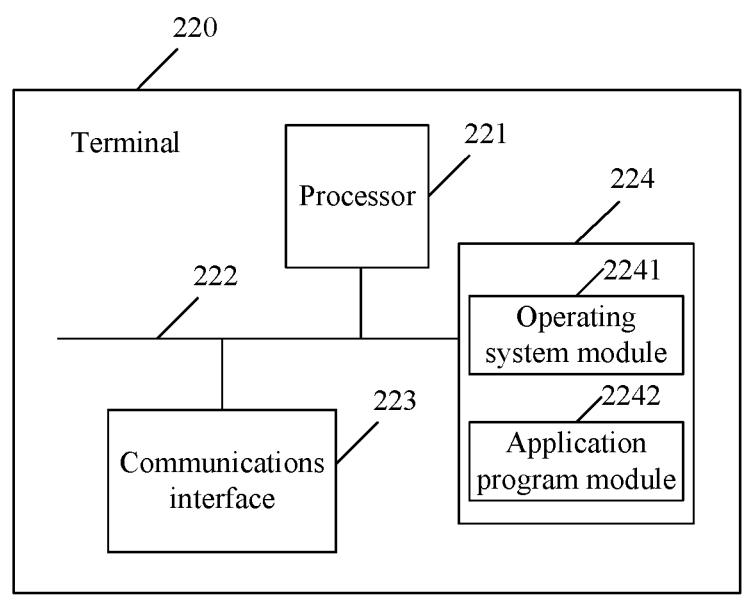
FIG. 22 is a schematic structural diagram of an MME according to an embodiment of the present invention.

An embodiment of the present invention further provides an MME. As shown in FIG. 22, the MME 220 includes at least one processor 221, at least one bus 222, at least one communications interface 223, and at least one memory 224.

The memory 221 is configured to store a computer executable instruction.

The processor 221 is connected to the communications interface 223 and the memory 224 by using the bus 222.

When a computer is run, the processor 221 executes the computer executable instruction stored in the memory 224, and the processor 221 is configured to:

receive a bearer resource modification request message sent by a first terminal, where the bearer resource modification request message carries context information of a second terminal, and the context information includes at least an identifier ID of the second terminal;

configure a second S1 bearer between a first eNB and a serving gateway S-GW according to the bearer resource modification request message, where the second S1 bearer is used to transmit service data of the second terminal; and send a bearer resource command message to the first eNB according to the bearer resource modification request message, so that the first eNB configures a first radio bearer between the first eNB and the first terminal, where the first radio bearer is used to transmit the service data of the second terminal.

Optionally, the processor is further configured to:

allocate an identifier of the second S1 bearer to the second terminal;

send a bearer resource command message to the S-GW, where the bearer resource command message carries the identifier of the second S1 bearer;

receive a bearer creation request message sent by the S-GW;

send an E-RAB modification request message to the first eNB according to the bearer creation request message;

receive an E-RAB bearer setting modification response message that is sent by the first eNB according to the E-RAB modification request message; and send a bearer creation response message to the S-GW according to the E-RAB bearer setting modification response message, so as to establish the second S1 bearer between the S-GW and the first eNB.

The embodiments in this specification are all described in a progressive manner, for same or similar parts in the embodiments, reference may be made to these embodiments, and each embodiment focuses on a difference from other embodiments. Especially, apparatus or system embodiments are basically similar to a method embodiment, and therefore are described briefly; for related parts, reference may be made to partial descriptions in the method embodiment. The described apparatus and system embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

It should be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a" does not, without more constraints, preclude the existence of additional identical elements in the process, method, article, or apparatus that includes the element.

The foregoing descriptions are merely specific implementations of the present invention for a person skilled in the art to understand or implement the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. An apparatus, comprising:
    a receiving unit configured to receive a link configuration request message sent by a second terminal, wherein the link configuration request message carries context information of the second terminal, and the context information comprises at least an identifier (ID) of the second terminal;
    a sending unit configured to send a bearer configuration request message to a network-side device covering a coverage area according to the link configuration request message, wherein the bearer configuration request message comprises a radio bearer modification request message or a bearer resource modification request message, the bearer configuration request message carries the context information of the second terminal, the bearer configuration request message is used to request the network-side device to configure a service bearer, and the service bearer is used to transmit service data of the second terminal between a first terminal within the coverage area and the network-side device;
    the receiving unit is further configured to receive a bearer configuration complete message that is sent by the network-side device according to the bearer configuration request message, wherein the bearer configuration complete message carries an ID of the service bearer;
    a processor configured to allocate a second IP address to the second terminal, establish a mapping relationship between a first IP address allocated by a data gateway P-GW to the second terminal and the second IP address, and establish a mapping relationship between an ID of a first radio bearer and the second IP address;

the sending unit is further configured to send a link configuration complete message to the second terminal after the mapping relationship between the first IP address and the second IP address and the mapping relationship between the ID of the first radio bearer and second IP address are established, so that the second terminal performs data transmission with the network-side device over the service bearer through the first terminal;

in an uplink direction, the receiving unit is further configured to receive uplink data sent by the second terminal, wherein a source IP address of the uplink data is the second IP address; and the processor is further configured to replace the source IP address of the uplink data with the first IP address.

2. The apparatus according to claim 1, wherein when sending the bearer configuration request message to the network-side device according to the link configuration request message, the sending unit is configured to:

send, according to the context information, a radio bearer modification request message to a first base station eNB that serves the first terminal, so that the first eNB configures the first radio bearer between the first eNB and the first terminal, wherein the first radio bearer is used to transmit the service data of the second terminal.

3. The apparatus according to claim 2, wherein when sending the bearer configuration request message to the network-side device according to the link configuration request message, the sending unit is configured to:

send a bearer resource modification request message to a mobility management entity MME according to the context information, so that the MME configures a second S1 bearer between the first eNB and a serving gateway S-GW, and the MME controls the first eNB to configure the first radio bearer between the first eNB and the first terminal, wherein the second S1 bearer and the first radio bearer are used to transmit the service data of the second terminal.

4. The apparatus according to claim 2, wherein
the sending unit is further configured to send, to the first eNB over the first radio bearer mapping the second IP address, the uplink data whose source IP address is replaced; or
in a downlink direction, the receiving unit is further configured to receive, over the first radio bearer mapping the second IP address, downlink data that is destined for the second terminal and whose destination IP address is the first IP address; the processor is further configured to replace the destination IP address of the downlink data with the second IP address; and the sending unit is further configured to send, to the second terminal, the downlink data whose destination IP address is replaced.

5. The apparatus according to claim 1,
wherein the context information further comprises the first IP address allocated by a data gateway P-GW to the second terminal.

6. The apparatus according to claim 2, wherein
the context information of the second terminal further comprises an originally-accessed-cell ID of the second terminal,
the receiving unit is further configured to receive the originally-accessed-cell ID of the second terminal in the context information, and
the sending unit is further configured to send the originally-accessed-cell ID of the second terminal to the first eNB.

7. The apparatus according to claim 6, wherein when an ID of the first eNB is same as the originally-accessed-cell ID of the second terminal, the processor is further configured to configure the first radio bearer between the first eNB and the first terminal according to the radio bearer modification request message.

8. The apparatus according to claim 6, wherein when an ID of the first eNB is different from the originally-accessed-cell ID of the second terminal, the sending unit is configured to send a handover request message to a source eNB corresponding to the originally-accessed-cell ID of the second terminal.

9. The apparatus according to claim 8, wherein the receiving unit is further configured to receive a handover acknowledgment message sent by the source eNB.

10. The apparatus according to claim 9, wherein when the handover acknowledgment message sent by the source eNB is received, the processor is further configured to configure the first radio bearer between the first eNB and the first terminal according to the radio bearer modification request message.

11. A method, comprising:
receiving a link configuration request message sent by a second terminal, wherein the link configuration request message carries context information of the second terminal, and the context information comprises at least an identifier (ID) of the second terminal;
sending a bearer configuration request message to a network-side device covering a coverage area according to the link configuration request message, wherein the bearer configuration request message comprises a radio bearer modification request message or a bearer resource modification request message, the bearer configuration request message carries the context information of the second terminal, the bearer configuration request message is used to request the network-side device to configure a service bearer, and the service bearer is used to transmit service data of the second terminal between a first terminal within the coverage area and the network-side device;
receiving a bearer configuration complete message that is sent by the network-side device according to the bearer configuration request message, wherein the bearer configuration complete message carries an ID of the service bearer;
allocating a second IP address to the second terminal, establishing a mapping relationship between a first IP address allocated by a data gateway P-GW to the second terminal and the second IP address, and establishing a mapping relationship between an ID of a first radio bearer and the second IP address;
sending a link configuration complete message to the second terminal after the mapping relationship between the first IP address and the second IP address and the mapping relationship between the ID of the first radio bearer and second IP address are established, so that the second terminal performs data transmission with the network-side device over the service bearer through the first terminal;
in an uplink direction, receiving uplink data sent by the second terminal, wherein a source IP address of the uplink data is the second IP address; and
replacing the source IP address of the uplink data with the first IP address.

12. The method according to claim 11, wherein sending the bearer configuration request message to the network-side device according to the link configuration request message comprises:
    sending, according to the context information, a radio bearer modification request message to a first base station eNB that serves the first terminal, so that the first eNB configures the first radio bearer between the first eNB and the first terminal, wherein the first radio bearer is used to transmit the service data of the second terminal.

13. The method according to claim 12, wherein sending the bearer configuration request message to the network-side device according to the link configuration request message comprises:
    sending a bearer resource modification request message to a mobility management entity MME according to the context information, so that the MME configures a second S1 bearer between the first eNB and a serving gateway S-GW, and the MME controls the first eNB to configure the first radio bearer between the first eNB and the first terminal, wherein the second S1 bearer and the first radio bearer are used to transmit the service data of the second terminal.

14. The method according to claim 12, further comprising:
    sending, to the first eNB over the first radio bearer mapping the second IP address, the uplink data whose source IP address is replaced; or
    in a downlink direction, receiving, over the first radio bearer mapping the second IP address, downlink data that is destined for the second terminal and whose destination IP address is the first IP address, replacing the destination IP address of the downlink data with the second IP address, and sending, to the second terminal, the downlink data whose destination IP address is replaced.

15. The method according to claim 12,
    wherein the context information of the second terminal further comprises an originally-accessed-cell ID of the second terminal; and
    further comprising:
    receiving the originally-accessed-cell ID of the second terminal in the context information; and
    sending the originally-accessed-cell ID of the second terminal to the first eNB.

16. The method according to claim 15, further comprising: when an ID of the first eNB is same as the originally-accessed-cell ID of the second terminal, configuring the first radio bearer between the first eNB and the first terminal according to the radio bearer modification request message.

17. The method according to claim 15, further comprising: when an ID of the first eNB is different from the originally-accessed-cell ID of the second terminal, sending a handover request message to a source eNB corresponding to the originally-accessed-cell ID of the second terminal.

18. The method according to claim 17, further comprising: receiving a handover acknowledgment message sent by the source eNB.

19. The method according to claim 18, further comprising: when the handover acknowledgment message sent by the source eNB is received, configuring the first radio bearer between the first eNB and the first terminal according to the radio bearer modification request message.

20. The method according to claim 11, wherein the context information further comprises the first IP address allocated by a data gateway P-GW to the second terminal.

* * * * *